United States Patent
Huang-Fu et al.

(10) Patent No.: US 10,869,245 B2
(45) Date of Patent: Dec. 15, 2020

(54) HANDLING OF INTERWORKING WITH EPC IN PRESENCE OF NON-3GPP PDU SESSIONS

(71) Applicant: MEDIATEK INC., Hsinchu (TW)

(72) Inventors: Chien-Chun Huang-Fu, Hsinchu (TW); Zong-Syun Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/374,249

(22) Filed: Apr. 3, 2019

(65) Prior Publication Data

US 2019/0313290 A1 Oct. 10, 2019

Related U.S. Application Data

(60) Provisional application No. 62/655,137, filed on Apr. 9, 2018.

(51) Int. Cl.
*H04W 36/14* (2009.01)
*H04W 36/00* (2009.01)
(Continued)

(52) U.S. Cl.
CPC ......... *H04W 36/14* (2013.01); *H04L 47/2441* (2013.01); *H04L 47/2491* (2013.01);
(Continued)

(58) Field of Classification Search
CPC ..... H04W 36/14; H04W 24/02; H04W 76/38; H04W 36/0011; H04W 28/24;
(Continued)

(56) References Cited

U.S. PATENT DOCUMENTS

| 9,713,040 B2* | 7/2017 | Cheng | H04W 36/0033 |
| 2014/0036873 A1* | 2/2014 | Cheng | H04W 36/0033 370/331 |

(Continued)

FOREIGN PATENT DOCUMENTS

| CN | 101730072 A | 6/2010 |
| CN | 101801102 A | 8/2010 |

(Continued)

OTHER PUBLICATIONS

International Search Report and Written Opinion of the International Searching Authority dated Jul. 5, 2019 in PCT/CN2019/081697, 9 pages.

(Continued)

*Primary Examiner* — Sharad Rampuria
(74) *Attorney, Agent, or Firm* — Oblon, McClelland, Maier & Neustadt, L.L.P.

(57) ABSTRACT

Aspects of the disclosure can provide an apparatus and method for operating a Protocol Data Unit (PDU) session associated with a non-3GPP access when the apparatus is to perform an inter-system change. The apparatus can include processing circuitry that is configured to connect to a first communication system over a 3GPP access and a non-3GPP access and switch the connection from the first communication system to a second communication system. Further, when in a release mode, the processing circuitry can release a PDU session that is in the first communication system over the non-3GPP access, and when in a transfer mode, the processing circuitry can transfer the PDU session that is in the first communication system over the non-3GPP access to a Packet Data Network (PDN) connection that is in the second communication system over a 3GPP access.

17 Claims, 15 Drawing Sheets

(51) Int. Cl.
*H04L 29/08* (2006.01)
*H04W 24/02* (2009.01)
*H04W 76/38* (2018.01)
*H04W 28/24* (2009.01)
*H04W 60/06* (2009.01)
*H04L 12/851* (2013.01)
*H04L 12/857* (2013.01)
*H04L 12/863* (2013.01)
*H04L 29/06* (2006.01)
*H04W 28/02* (2009.01)
*H04W 88/02* (2009.01)
*H04W 84/04* (2009.01)

(52) U.S. Cl.
CPC ........ *H04L 47/6295* (2013.01); *H04L 67/141* (2013.01); *H04L 67/143* (2013.01); *H04L 69/22* (2013.01); *H04W 24/02* (2013.01); *H04W 28/0268* (2013.01); *H04W 28/24* (2013.01); *H04W 36/0011* (2013.01); *H04W 36/0033* (2013.01); *H04W 60/06* (2013.01); *H04W 76/38* (2018.02); *H04W 84/042* (2013.01); *H04W 88/02* (2013.01)

(58) Field of Classification Search
CPC ............. H04W 60/06; H04W 28/0268; H04W 36/0033; H04W 88/02; H04W 84/042; H04W 36/0022; H04W 36/00; H04W 36/0005; H04W 36/0007; H04W 36/0009; H04W 36/0016; H04W 36/03; H04L 67/141; H04L 67/143; H04L 47/2441; H04L 47/2491; H04L 47/6295; H04L 69/22; H04L 47/767; H04B 7/18541
See application file for complete search history.

(56) References Cited

U.S. PATENT DOCUMENTS

2018/0376384 A1* 12/2018 Youn ........................ H04W 8/02
2020/0015128 A1* 1/2020 Stojanovski ............ H04W 8/08

FOREIGN PATENT DOCUMENTS

CN  103002543 A  3/2013
WO  WO 2012/147270 A1  11/2012

OTHER PUBLICATIONS

Taiwanese Office Action dated Mar. 9, 2020, in Patent Application No. 108112134, 10 pages (with English Translation of Category of Cited Documents).
3GPP, "3rd Generation Partnership Project; Technical Specification Group Services and System Aspects; Procedures for the 5G System; Stage 2(Release 15)", 3GPP TS 23.502 V15.1.0, 285 pages.
3GPP, "3rd Generation Partnership Project; Technical Specification Group Services and System Aspects; Architecture enhancements for non-3GPP accesses (Release 15)", 3GPP TS 23.402 V15. 3.0, 314 pages.

* cited by examiner

HANDLING OF INTERWORKING WITH EPC IN PRESENCE OF NON-3GPP PDU SESSIONS

INCORPORATION BY REFERENCE

This present disclosure claims the benefit of U.S. Provisional Application No. 62/655,137, "5GSM Enhancement on Interworking" filed on Apr. 9, 2018, which is incorporated herein by reference in its entirety.

TECHNICAL FIELD

The present disclosure relates to mobile communications, and specifically relates to Protocol Data Unit (PDU) session operations in the fifth generation system (5GS).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The mobile communication system has grown exponentially over the years. The $3^{rd}$ generation partnership project (3GPP), which has developed the most successful standard technologies in mobile communication market such as Universal Mobile Telecommunication System (UMTS) and Long Term Evolution (LTE), is currently carrying out the standardization of the fifth generation (5G) system (5GS), which includes a core network and an access network. The access network can integrate different access types, e.g., 3GPP access and non-3GPP access. Specifically, a 3GPP access is a radio access technology (RAT) specified by 3GPP, and a non-3GPP access is an access technology that is not specified by 3GPP. The technologies for 3GPP access can include Global System for Mobile communications (GSM), UMTS, LTE, 5G New Radio (NR) and the like. The technologies for non-3GPP access can include Wi-Fi, Code-Division Multiple Access 2000 (CDMA2000), Worldwide Interoperability for Microwave Access (WiMAX), Digital Subscriber Line (DSL), and the like.

User equipment (UE) can connect to the 5G core network (5GC) over a 3GPP access and a non-3GPP access, and establish Protocol Data Unit (PDU) sessions associated with the 3GPP access and the non-3GPP access, respectively. When the UE is to perform an inter-system change from the 5GS to another communication system, the UE can transfer the PDU sessions that are in the 5GS over the 3GPP access. For example, when the UE is to perform an inter-system change from a 5GS to a fourth generation (4G) system, i.e., an Evolved Packet System (EPS), the UE can transfer the PDU sessions that are in the 5GS over the 3GPP access to the Packet Data Network (PDN) connections that are in the EPS over the 3GPP access. For the PDU sessions that are in the 5GS over the non-3GPP access, the UE can either release or transfer the PDU sessions, based on the UE preference, policy or/and network notifications.

SUMMARY

Aspects of the disclosure provide an apparatus to operate a Protocol Data Unit (PDU) session associated with a non-3GPP access when the apparatus is to perform an inter-system change. The apparatus can include processing circuitry that is configured to connect to a first communication system over a 3GPP access and a non-3GPP access and switch the connection from the first communication system to a second communication system. Further, when in a release mode, the processing circuitry can release a PDU session that is in the first communication system over the non-3GPP access, and when in a transfer mode, the processing circuitry can transfer the PDU session that is in the first communication system over the non-3GPP access to a Packet Data Network (PDN) connection that is in the second communication system over a 3GPP access.

In an embodiment, when the apparatus releases the PDU session that is in the first communication system over the non-3GPP access, the processing circuitry of the apparatus can be further configured to release the PDU session locally at the apparatus, or release the PDU session by using a non-access stratum (NAS) procedure.

In a further embodiment, when the apparatus transfers the PDU session that is in the first communication system over the non-3GPP access to the PDN connection that is in the second communication system over the 3GPP access, the processing circuitry of the apparatus can be further configured to transfer the PDU session that is in the first communication system over the non-3GPP access to the PDU session that is in the first communication system over the 3GPP access, and then transfer the PDU session that is in the first communication system over the 3GPP access to the PDN connection that is in the second communication system over the 3GPP access, or transfer the PDU session that is in the first communication system over the non-3GPP access directly to the PDN connection that is in the second communication system over the 3GPP access.

In an embodiment, when the apparatus transfers the PDU session that is in the first communication system over the non-3GPP access directly to the PDN connection that is in the second communication system over the 3GPP access, the processing circuitry of the apparatus can be further configured to initiate a PDN connectivity procedure in the second communication system over the 3GPP access.

In an embodiment, the processing circuitry of apparatus can be configured to suspend the inter-system change between the first communication system and the second communication system, maintain the PDU session that is in the first communication system over the non-3GPP access, and resume the inter-system change after the PDU session over the non-3GPP access is completed.

In an embodiment, the processing circuitry of apparatus can be further configured to suspend the inter-system change between the first communication system and the second communication system, transfer the PDU session that is in the first communication system from the non-3GPP access to the 3GPP access, and resume the inter-system change after transferring the PDU session from the non-3GPP access to the 3GPP access.

In an embodiment, the processing circuitry of apparatus is further configured to deregister the PDU session from the first communication system over the non-3GPP access when the processing circuitry of the apparatus does not support concurrent registrations to the first communication system over the non-3GPP access and the second communication system over the 3GPP access. The first communication system can be a fifth generation system (5GS) and the second communication system can be a fourth generation (4G) system, i.e., an Evolved Packet System (EPS).

Aspects of the disclosure can further provide a method for PDU session operations, including connecting, by a processing circuitry of user equipment (UE), to a first communication system over a 3GPP access and a non-3GPP access and switching the connection from the first communication system to a second communication system. Further, when in a release mode, the method can include releasing a PDU session that is in the first communication system over the non-3GPP access, and when in a transfer mode, transferring the PDU session that is in the first communication system over the non-3GPP access to a PDN connection that is in the second communication system over a 3GPP access.

In an embodiment, releasing the PDU session that is in the first communication system over the non-3GPP access, further includes releasing locally at the UE, or releasing using a NAS procedure.

In an embodiment, transferring the PDU session that is in the first communication system over the non-3GPP access to a PDN connection that is in the second communication system over the 3GPP access, further includes transferring the PDU session that is in the first communication system over the non-3GPP access to the PDU session that is in the first communication system over the 3GPP access, and then transferring the PDU session that is in the first communication system over the 3GPP access to the PDN connection that is in the second communication system over the 3GPP access, or transferring the PDU session that is in the first communication system over the non-3GPP access directly to the PDN connection that is in the second communication system over the 3GPP access.

In an embodiment, transferring the PDU session that is in the first communication system over the non-3GPP access directly to the PDN connection that is in the second communication system over the 3GPP access, further includes initiating a PDN connectivity procedure in the second communication system over the 3GPP access.

Further embodiment of the disclosure further can provide a method for PDU session operations, including suspending an inter-system change from the first communication system to the second communication system, maintaining the PDU session that is in the first communication system over the non-3GPP access, and resuming the inter-system change after the PDU session over the non-3GPP access is completed.

Further embodiment of the disclosure further can provide a method for PDU session operations, including suspending an inter-system change from the first communication system to the second communication system, transferring the PDU session that is in the first communication system from the non-3GPP access to the 3GPP access, and resuming the inter-system change after transferring the PDU session from the non-3GPP access to the 3GPP access.

Aspects of the disclosure can further provide a non-transitory computer readable medium storing instructions which, when executed by a processor, cause the processor to connect to a first communication system over a 3GPP access and a non-3GPP access, switch the connection from the first communication system to a second communication system, and wherein, in a release mode, releasing a PDU session that is in the first communication system over the non-3GPP access, and in a transfer mode, transferring the PDU session that is in the first communication system over the non-3GPP access to a PDN connection that is in the second communication system over a 3GPP access.

In an embodiment, the non-transitory computer readable medium stores instructions which, when executed by a processor, cause the processor to release the PDU session that is in the first communication system over the non-3GPP access locally by the apparatus, or release the PDU session that is in the first communication system over the non-3GPP access by using a NAS procedure.

In an embodiment, the non-transitory computer readable medium stores instructions which, when executed by a processor, cause the processor to transfer the PDU session that is in the first communication system over the non-3GPP access to the PDU session that is in the first communication system over the 3GPP access and then transfer the PDU session that is in the first communication system over the 3GPP access to the PDN connection that is in the second communication system over the 3GPP access, or transfer the PDU session that is in the first communication system over the non-3GPP access directly to the PDN connection that is in the second communication system over the 3GPP access.

In an embodiment, the non-transitory computer readable medium stores instructions which, when executed by a processor, cause the processor to suspend an inter-system change between the first communication system and the second communication system, maintain the PDU session that is in the first communication system over the non-3GPP access, and resume the inter-system change after the PDU session over the non-3GPP access is completed.

In another embodiment, the non-transitory computer readable medium stores instructions which, when executed by a processor, cause the processor to suspend an inter-system change between the first communication system and the second communication system, transfer the PDU session that is in the first communication system from the non-3GPP access to the 3GPP access, and resume the inter-system change after transferring the PDU session from the non-3GPP access to the 3GPP access.

Further embodiments of the disclosure further can provide a non-transitory computer readable medium storing instructions which, when executed by a processor, cause the processor to deregister from the first communication system over the non-3GPP access when the processor cannot support concurrent registrations to the first communication system over the non-3GPP access and the second communication system over the 3GPP access.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide an apparatus to operate a Protocol Data Unit (PDU) session that is in a fifth generation (5G) system (5GS). When the apparatus is to perform an inter-system change from the 5GS to another communication system, such as a fourth generation (4G) system, i.e., an Evolved Packet System (EPS), the apparatus cannot concurrently have a PDU session in the 5GS over the non-3GPP access and a Protocol Data Network (PDN) connection in the EPS over the 3GPP access. Therefore, the apparatus can either release or transfer the PDU session in the 5GS over the non-3GPP access. In a release mode, the apparatus can release the PDU session that is in the 5GS over the non-3GPP access locally or by a Non-Access Stratum (NAS) procedure. And in a transfer mode, the apparatus can transfer the PDU session that is in the 5GS over the non-3GPP access to a PDN connection that is in an EPS over a 3GPP access.

In some examples, the apparatus can suspend the inter-system change and maintain the PDU session that is in the 5GS over the non-3GPP access, and resume the inter-system change when the PDU session over the non-3GPP access is completed.

In some other examples, the apparatus can suspend the inter-system change and transfer the PDU session that is in the 5GS from the non-3GPP access to the 3GPP access, and resume the inter-system change after transferring the PDU session from the non-3GPP access to the 3GPP access.

When the apparatus cannot support the concurrent registration to the 5GS over the non-3GPP access and the EPS over the 3GPP access, the apparatus can deregister from the 5GS over the non-3GPP access. For example, the apparatus can deregister from the 5GS over the non-3GPP access before activating the transfer mode.

Figure 1:
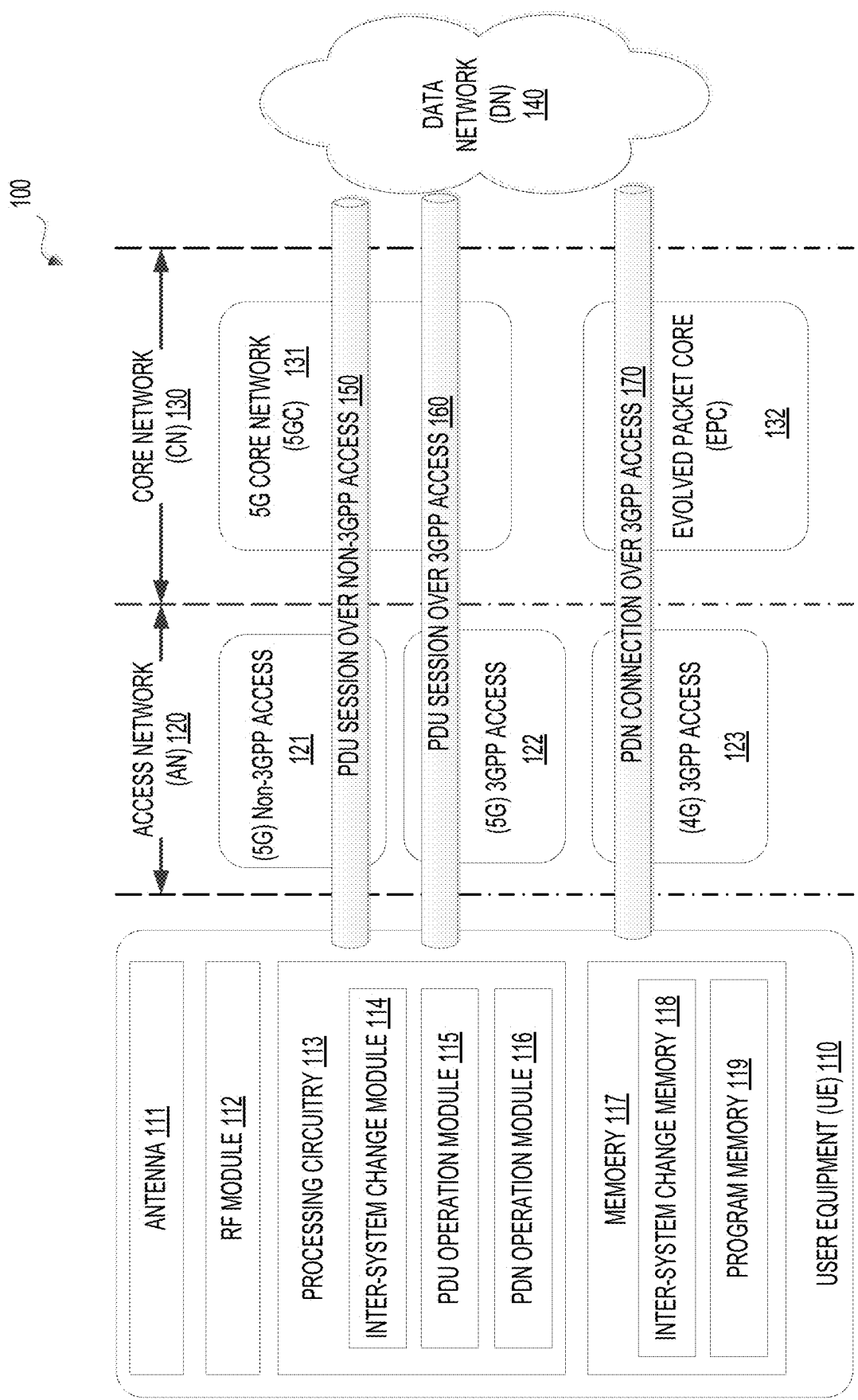
FIG. 1 shows an exemplary inter-system change from a first communication system to a second communication system according to an embodiment of the disclosure.

FIG. 1 shows an exemplary inter-system change procedure 100 from a first communication system to a second communication system according to an embodiment of the disclosure. As shown, each communication system can include a user equipment (UE) 110, an access network (AN) 120, a core network (CN) 130, and a data network (DN) 140. For purposes of clarity in this description, the first communication system can be a 5GS and the second communication system can be an EPS.

The UE 110 can be any apparatus or network element in the communication system capable of signal transmission and reception. For example, the UE 110 can be a mobile phone, a laptop computer, a tablet, a vehicle carried mobile communication device, a utility meter fixed at a certain location, a commercial product with wireline or wireless communication capability and the like. While only one UE 110 is depicted in the FIG. 1, it should be understood that any number UEs 110 can be distributed in the communication system.

In the FIG. 1 example, the UE 110 can include an antenna 111, an RF module 112, a processing circuitry 113, and a memory 117. The antenna 111 can include one or more antenna arrays. The processing circuitry 113 can further include an inter-system change module 114, a PDU operation module 115, and a PDN operation module 116. The memory 117 can further include an inter-system change memory 118 and a program memory 119. The inter-system change module 114 of the processing circuitry 113 can perform inter-system change by executing the program instructions stored in the inter-system memory 118 to switch the connection from the first communication system (e.g., 5GS) to the second communication system (e.g., EPS). The PDU operation module 115 of the processing circuitry 113 can operate PDU sessions by executing the program instructions (e.g., establishment, modification, and release) stored in the program memory 119 when the UE 110 is in the 5GS. Similarly, The PDN operation module 116 of the processing circuitry 113 can operate PDN connections by executing the program instructions (e.g., establishment, modification, and release) stored in the program memory 119 when the UE 110 is in the EPS. It should be understood that the processing circuitry 113 of the UE 110 can include any other modules which can implement any other functionalities by executing the program instructions stored in the memory 117.

The AN 120 is part of the communication system that implements access technologies. It resides between the UE 110 and the CN 130. In general, the access technologies implemented in the AN 120 can be categorized into two types: 3GPP access and non-3GPP access. A 3GPP access is a radio access technology (RAT) specified by the 3GPP, and a non-3GPP access is an access technology that is not specified by the 3GPP. Exemplary technologies for 3GPP access can include Global System for Mobile communications (GSM), Universal Mobile Telecommunication System (UMTS), Long Term Evolution (LTE), 5G New Radio (NR) and the like. Exemplary technologies for non-3GPP access can include Wi-Fi, Code-Division Multiple Access 2000 (CDMA2000), Worldwide Interoperability for Microwave Access (WiMAX), Digital Subscriber Line (DSL), and the like. In the FIG. 1 example, the AN 120 includes a 5G non-3GPP access 121, a 5G 3GPP access 122, and a 4G 3GPP access 123.

The CN 130 is another part of the communication system that provides service management and delivery over wireless, fixed, or converged networks. As shown, the CN 130 can be a 5G CN (5GC) 131 for the 5GS or an Evolved Packet Core (EPC) 132 for the EPS. In the FIG. 1 example, the inter-system change is performed when the UE 110 switches the connection from the 5GC 131 to the EPC 132.

The DN 140 is a digital network that can provide different Internet services and applications to the UE 110. The Internet services and applications can be access to World Wide Web (WWW), digital video, digital audio, cloud storage and server, the use of email and instant message (IM) applications, and the like. For example, the DN 140 can provide the Internet services and applications to the UE 110 through one or more PDN connection(s) 170 in the EPS and one or more PDU session(s) 150-160 in the 5GS.

In operation, the UE 110 can connect to the CN 130 over a 3GPP access 121, or a non-3GPP access 122. Alternatively, the UE 110 can simultaneously connect to the CN 130 over the 3GPP access 121 and the non-3GPP access 122. Then, the UE 110 can obtain Internet services and applications from the DN 140 which is connected with the CN 130.

In the FIG. 1 example, the UE 110 can simultaneously connect to the 5GC 131 over the non-3GPP access 121 and the 3GPP access 122. The UE 110 can further receive Internet services and applications from the DN 140 by establishing one or more PDU session(s) 150 over the non-3GPP access 121 and one or more PDU session(s) 160 over the 3GPP access 122, respectively. Alternatively, the UE 110 can simultaneously connect to the 5GC 131 over the non-3GPP access 121 and the 3GPP access 122, and only establish one or more PDU session(s) 150 over the non-3GPP access 121. Herein, the UE 110 can only register to the 5GS over the 3GPP access 122 but with no PDU session 160 over the 3GPP access 122.

When the UE 110 is to perform an inter-system change 100 from a first communication system to a second communication system, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the first communication system, and registration request for the second communication system. For example, when the UE 110 perform the inter-system change 100 from the 5GS to the EPS, the UE 110 can reselect a 3GPP access 123 in the EPS to engage with an EPC 132 over the 3GPP access 123. Further, the UE 110 can establish a PDN connection 170 over the 3GPP access 123 in the EPS, or transfer the PDU session 160 over the 3GPP access 122 in the 5GS to the PDN connection 170 over the 3GPP access 123 in the EPS. As shown in the FIG. 1, the PDN operation module 116 can execute the program instructions stored in the program memory 119 to generate PDN connectivity request. Then the RF module 112 can process the generated PDN connectivity request and transmit via the antenna 111. Upon reception of the PDN connectivity request, the EPC 132 can establish the PDN connection 170 between the UE 110 and DN 140. In additional, the PDU operation module 115 and the PDN operation module 116 of the UE 110 can also work together and execute the program instructions stored in the program memory 119 to transfer the PDU session 160 over the 3GPP access 122 in the 5GS to the PDN connection 170 over the 3GPP access 123 in the EPS.

In some examples, when the UE 110 is in a release mode, the PDU operation module 115 can execute the program instructions stored in the program memory 119 to release the PDU session 150 over the non-3GPP access 121. When the UE 110 is in a transfer mode, the PDU operation module 115 can execute the program instructions stored in the program memory 119 to transfer the PDU session 150 over the non-3GPP access 121 to the PDN connection 170 over the 3GPP access 123. The selection of release mode and transfer mode can be determined by the UE policy, the UE preference, the network notifications, and the like. For example, when the UE 110 does not support concurrent registration to the 5GS and the EPS, the UE 110 can activate the release mode.

In some other examples, the UE 110 can suspend the inter-system change 100 and maintain the PDU session 150 over the non-3GPP access 121 in the 5GS. When the PDU session 150 over the non-3GPP access 121 is completed, the UE 110 can further resume the inter-system change 100 from the 5GS to the EPS.

Alternatively, the UE 110 can suspend the inter-system change 100 and transfer the PDU session 150 from the non-3GPP access 121 to the 3GPP access 122. Then, the UE 110 can resume the inter-system change 100 after transferring the PDU session 150 from the non-3GPP access 121 to the 3GPP access 122.

In some examples, the UE 110 cannot support concurrent registrations to the 5GC 131 over the non-3GPP access 121 and the EPC 132 over the 3GPP access 123. The UE 110 can deregister from the 5GC 131 over the non-3GPP access 121. For example, before the UE 110 can activate the transfer mode to transfer the PDU session 150 from the non-3GPP access 121 to the 3GPP access 122, the inter-system change 100 can trigger the UE 110 to deregister from the 5GC 131 over the non-3GPP access 121.

Figure 2:
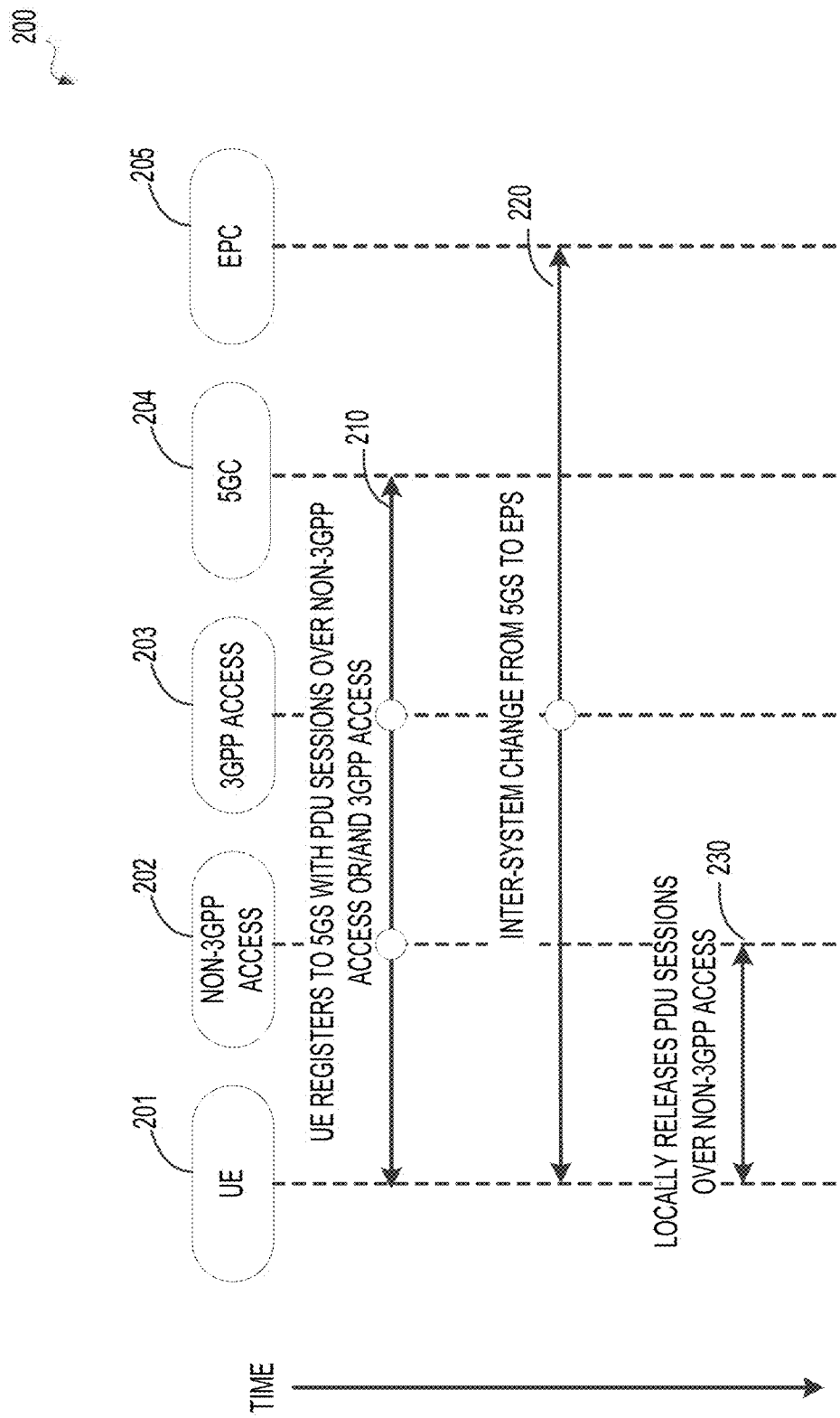
FIG. 2 shows an exemplary PDU session release procedure according to an embodiment of the disclosure.

FIG. 2 illustrates an exemplary PDU session release procedure 200 according to an embodiment of the disclosure. In the FIG. 2 example, the UE 201 is in the release mode and the procedure 200 can include three stages 210, 220, and 230.

At stage 210, the UE 201 in a 5GS can connect to a 5GC 204 over a non-3GPP access 202 and a 3GPP access 203. In some examples, the UE 201 can concurrently have at least one PDU session over the non-3GPP 202 and one PDU session over the 3GPP access 203. In some other examples, the UE 201 can register to the 5GS over the 3GPP access 203 but have no PDU session over the 3GPP access 203. Instead, the UE 201 can have at least one PDU session over the non-3GPP access 202.

At stage 220, the UE 201 is to perform an inter-system change from the 5GS to an EPS by switching the connection from the 5GC 204 to an EPC 205 over the 3GPP access 203.

At stage 230, the UE 201 can locally release the PDU session over the non-3GPP access 202. For example, as shown in the FIG. 1, the PDU operation module 115 can execute the program instructions stored in the program memory 119 to locally release the PDU session 150 over the non-3GPP access 121, without notifying the 5GC 131 of the PDU session release request.

Figure 3:
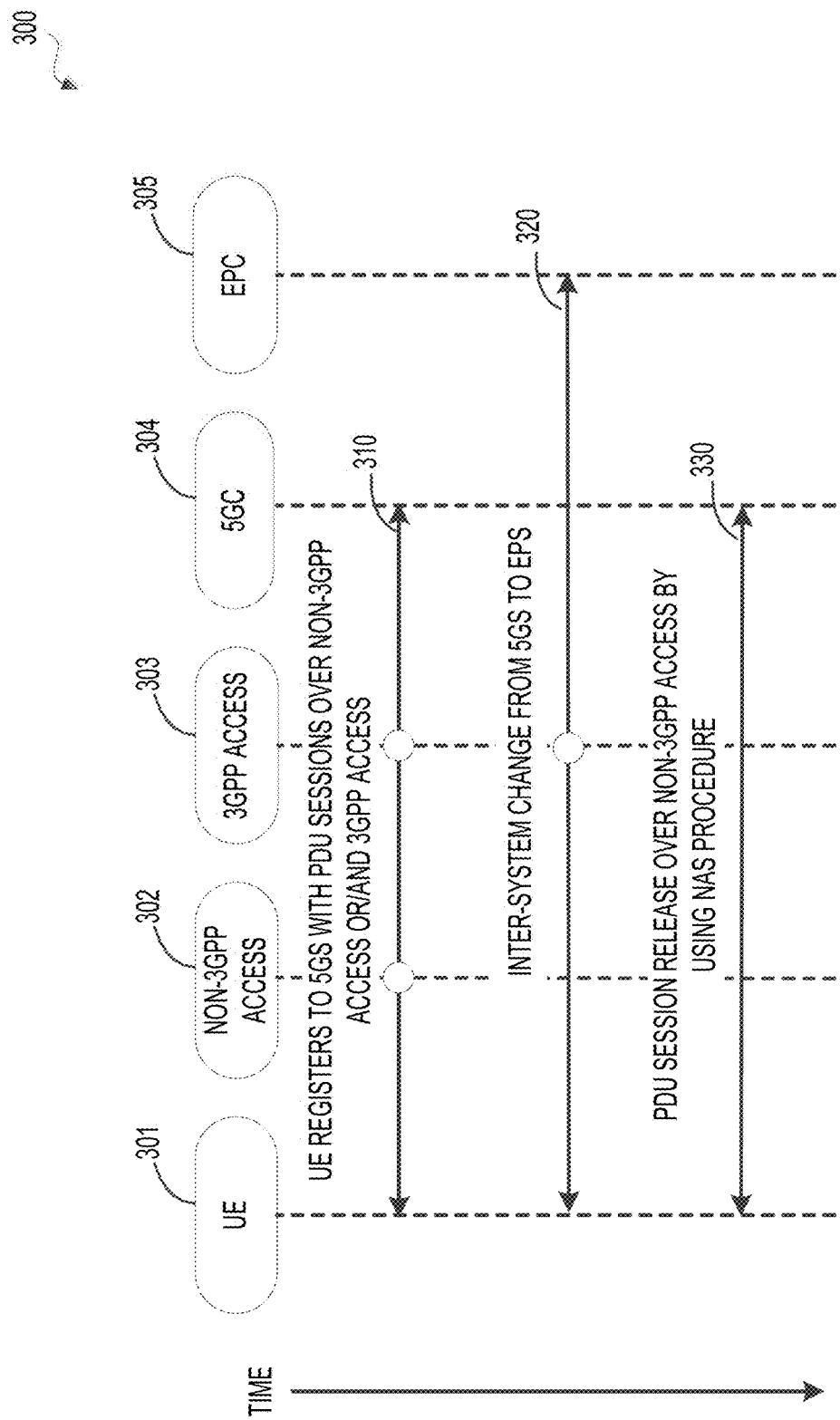
FIG. 3 shows another exemplary PDU session release procedure according to an embodiment of the disclosure.

FIG. 3 illustrates another exemplary PDU session release procedure 300 according to an embodiment of the disclosure. In the FIG. 3 example, the UE 301 is in the release mode and the procedure 300 can include three stages 310, 320, and 330.

At stage 310, the UE 301 in a 5GS can connect to a 5GC 304 over a non-3GPP access 302 and a 3GPP access 303. In some examples, the UE 301 can concurrently have at least one PDU session over the non-3GPP 302 and one PDU session over the 3GPP access 303. In some other examples, the UE 301 can register to the 5GS over the 3GPP access 303 but have no PDU session over the 3GPP access 303. Instead, the UE 301 can have at least one PDU session over the non-3GPP access 302.

At stage 320, the UE 301 is to perform an inter-system change from the 5GS to an EPS by switching the connection from the 5GC 304 to an EPC 305 over the 3GPP access 303.

At stage 330, the UE 301 can release the PDU session over the non-3GPP access 302 by using a NAS procedure. For example, as shown in the FIG. 1, the PDU operation module 115 can execute the program instructions stored in the program memory 119 to initiate a UE-requested PDU session release procedure, wherein the UE 110 can create a PDU session release request and send the request via the antenna 111 to the 5GC 131 over the NAS procedure. Upon the reception of the PDU session release request from the UE 110, the 5GC 131 can accept the release request from the UE 110 and perform a network-requested PDU session release procedure to finalize the PDU session release procedure.

Figure 4:
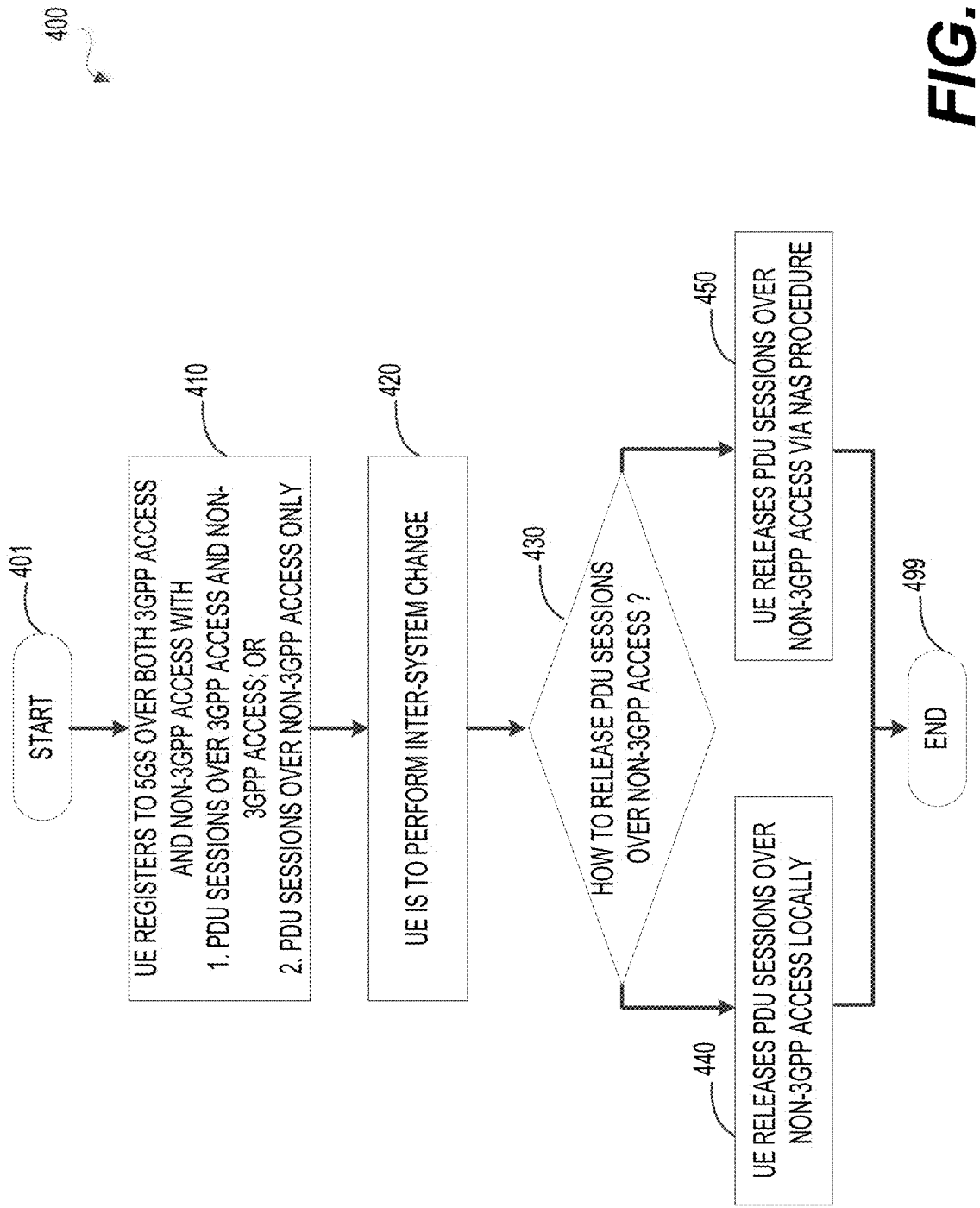
FIG. 4 is a flowchart showing an exemplary process wherein a UE releases a PDU session over a non-3GPP access according to an embodiment of the disclosure.

FIG. 4 shows a flowchart outlining an exemplary process 400 wherein the UE 110 releases the PDU session 150 over the non-3GPP access 121 according to an embodiment of the disclosure. The process 400 can be performed at the UE 110 which is connected to a first communication system and is to perform an inter-system change 100 from the first communication system to a second communication system. In the FIG. 4 example, the first communication system can be a 5GS and the second communication system can be an EPS. The process 400 can start from 401 and proceed to 410.

At 410, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 420.

At 420, the UE 110 can perform an inter-system change 100 from the 5GS to the EPS by switching the connection from the 5GC 131 to the EPC 132. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 430.

At 430, upon the inter-system change from the 5GS to the EPS, the UE 110 can decide how to release the PDU session 150 over the non-3GPP access 121. For example, as shown in the FIG. 1, the processing circuitry 113 of the UE 110 can trigger the PDU operation module 115 to execute the program instructions stored in the program memory 119. The executed instructions can further choose to either release the PDU session 150 locally, or via a NAS procedure. The process can then proceed to 440 when the UE 110 releases the PDU session 150 locally or to 450 when the UE 110 releases the PDU session 150 via a NAS procedure.

At 440, the UE 110 can locally release the PDU session 150 over the non-3GPP access 121. For example, as shown in the FIG. 1, the PDU operation module 115 can execute the program instructions stored in the program memory 119 to locally release the PDU session 150 over the non-3GPP access 121 in the 5GS, without notifying the 5GC 131 of the PDU session release request. The process can then proceed to 499 and terminate.

Alternatively, at 450, the UE 110 can release the PDU session 150 over the non-3GPP access 121 via the NAS procedure. For example, as shown in the FIG. 1, the PDU operation module 115 can execute the program instructions stored in the program memory 119 to initiate a UE-requested PDU session release procedure, wherein a PDU session release request is created and is sent to the 5GC 131 over the NAS procedure. Upon the reception of the PDU session release request from the UE 110, the 5GC 131 can accept the release request from the UE 110 and perform a network-requested PDU session release procedure to finalize the PDU session release procedure. The process can then proceed to 499 and terminate.

Figure 5:
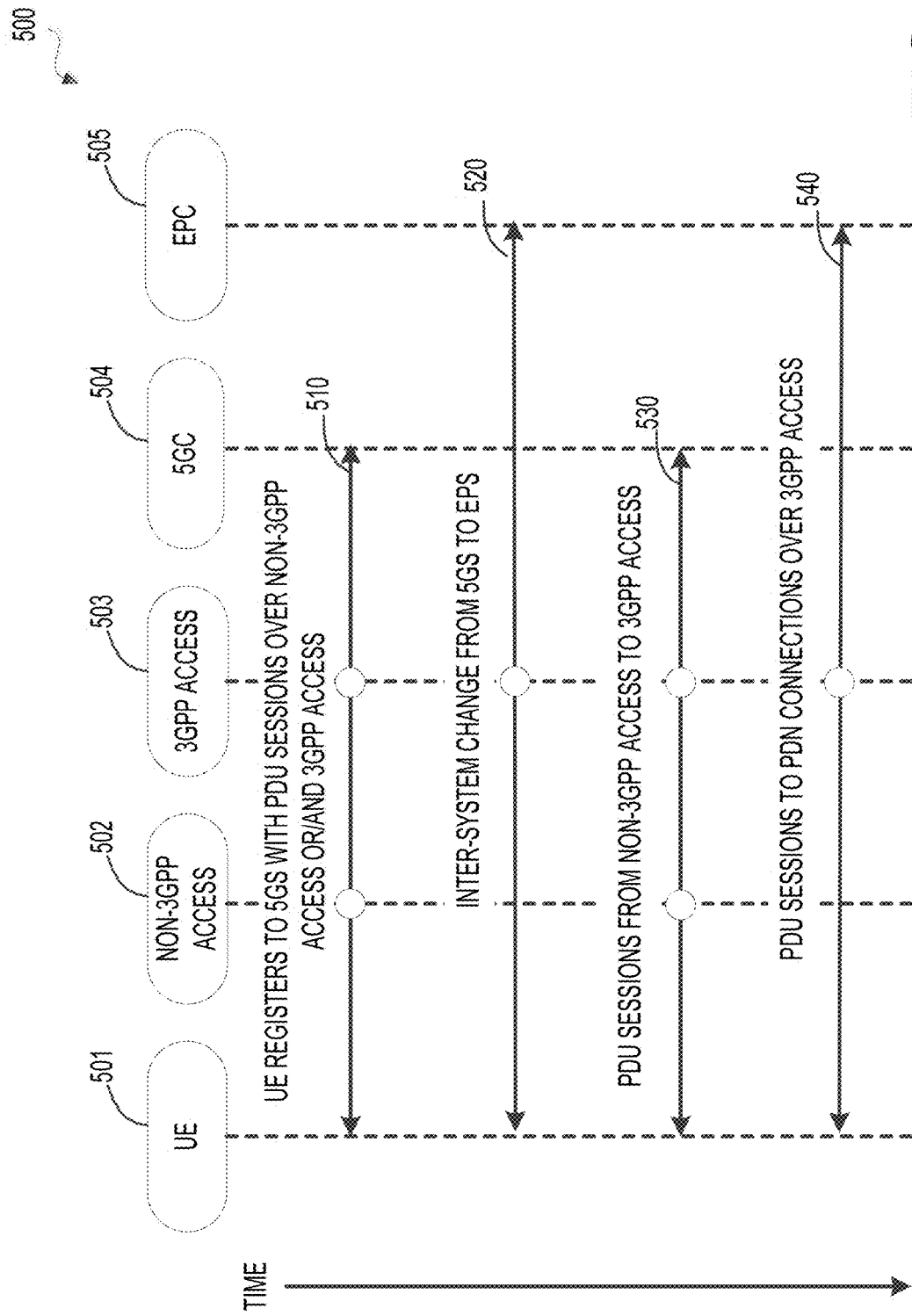
FIG. 5 shows an exemplary PDU session transfer procedure according to an embodiment of the disclosure.

FIG. 5 illustrates an exemplary PDU session transfer procedure 500 according to an embodiment of the disclosure. In the FIG. 5 example, the UE 501 is in the transfer mode and the procedure 500 can include four stages 510, 520, 530, and 540.

At stage 510, the UE 501 in a 5GS can connect to a 5GC 504 over a non-3GPP access 502 and a 3GPP access 503. In some examples, the UE 501 can concurrently have at least one PDU session over the non-3GPP 502 and one PDU session over the 3GPP access 503. In some other examples, the UE 501 can register to the 5GS over the 3GPP access 503 but have no PDU session over the 3GPP access 503. Instead, the UE 501 can have at least one PDU session over the non-3GPP access 502.

At stage 520, the UE 501 is to perform an inter-system change from the 5GS to an EPS by switching the connection from the 5GC 504 to an EPC 505 over the 3GPP access 503.

At stage 530, the UE 501 can transfer the PDU session from the non-3GPP access 502 to the 3GPP access 503. For example, as shown in the FIG. 1, the PDU operation module 115 can execute the program instructions stored in the program memory 119 to initiate a 5GS session management (5GSM) procedure or a 5GS mobility management (5GMM) procedure to transfer the PDU session 150 from the non-3GPP access 121 to the 3GPP access 122.

At stage 540, the UE 501 can transfer the PDU session in the 5GS over the 3GPP access 503 to a PDN connection in the EPS over a 3GPP access 503. For example, as shown in the FIG. 1, the PDU operation module 115 and the PDN operation module 116 can work cooperatively and execute the program instructions stored in the program memory 119 to initiate a PDN connectivity procedure over a 3GPP access 123 and transfer the PDU session 160 over the 3GPP access 122 to the PDN connection 170 over the 3GPP access 123.

Figure 6:
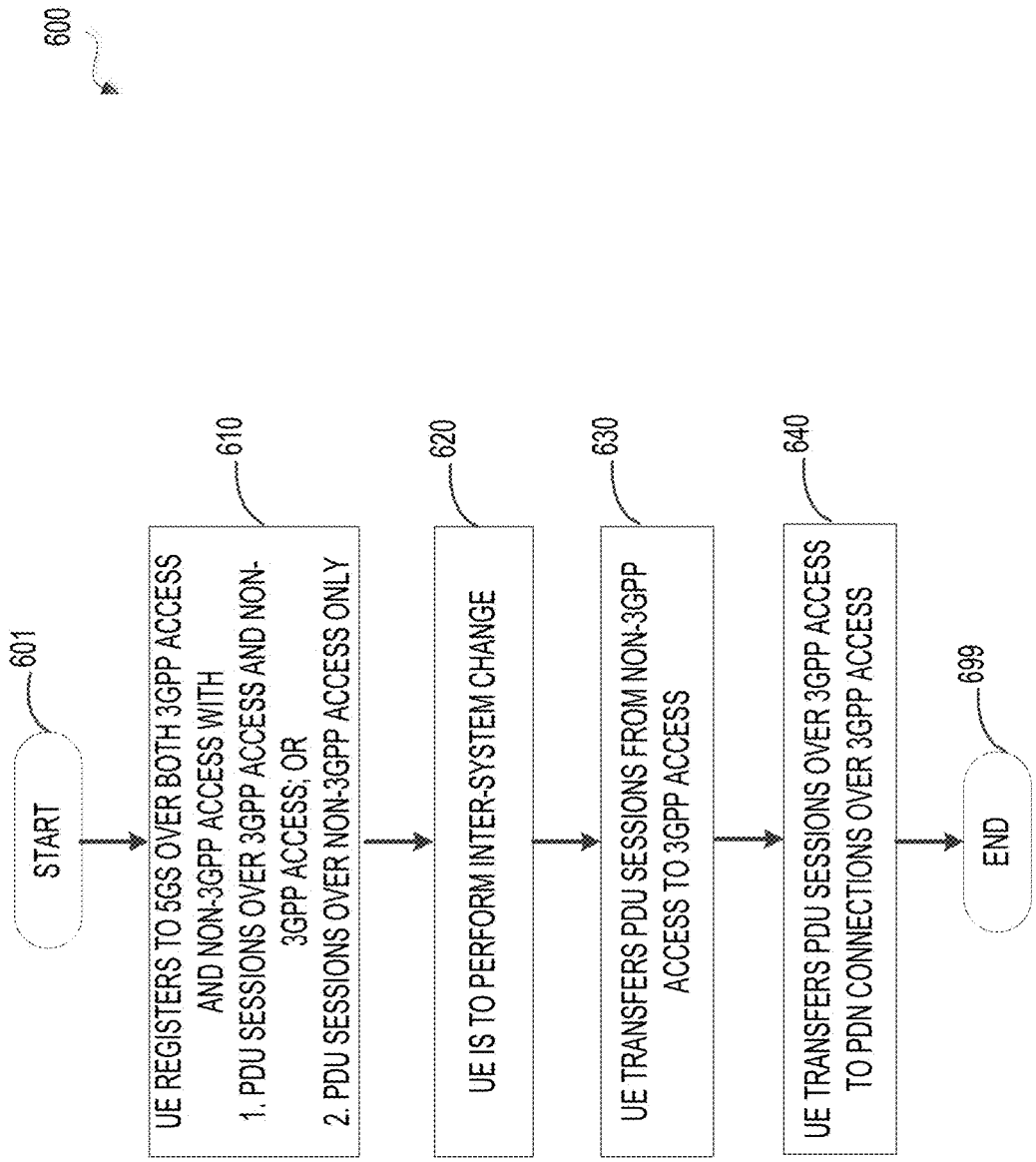
FIG. 6 is a flowchart showing an exemplary process wherein a UE transfers a PDU session over a non-3GPP access indirectly to a PDN connection over a 3GPP access according to an embodiment of the disclosure.

FIG. 6 shows a flowchart outlining an exemplary process 600 wherein the UE 110 transfers the PDU session 150 over the non-3GPP access 121 indirectly to the PDN connection 170 over the 3GPP access 123 according to an embodiment of the disclosure. The process 600 can be performed at the UE 110 which is connected to a first communication system and is to perform an inter-system change 100 from the first communication system to a second communication system. In the FIG. 6 example, the first communication system can be a 5GS and the second communication system can be an EPS. The process 600 can start from 601 and proceed to 610.

At 610, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 620.

At 620, the UE 110 can perform an inter-system change 100 from the 5GS to the EPS by switching the connection from the 5GC 131 to the EPC 132 over a 3GPP access 123. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 630.

At 630, upon the inter-system change 100 from the 5GS to the EPS, the UE 110 can transfer the PDU session 150 over the non-3GPP access 121 to the PDU session 160 over the 3GPP access 122. For example, as shown in the FIG. 1, the processing circuitry 113 of the UE 110 can trigger the PDU operation module 115 to execute the program instructions stored in the program memory 119. The executed instructions can further initiate a 5GSM procedure or a 5GMM procedure to transfer the PDU session 150 from the non-3GPP access 121 to the 3GPP access 122. Then all the PDU sessions 160 are over the 3GPP access 122. The process can then proceed to 640.

At 640, the UE 110 can further transfer the PDU session 160 in the 5GS over the 3GPP access 122 to a PDU connection 170 in the EPS over a 3GPP access 123. For example, the PDU operation module 115 and the PDN operation module 116 can work cooperatively and execute the program instructions stored in the program memory 119 to initiate a PDN connectivity procedure over a 3GPP access 123 and transfer the PDU session 160 over the 3GPP access 122 to the PDN connection 170 over the 3GPP access 123. The process can then proceed to 699 and terminate.

Figure 7:
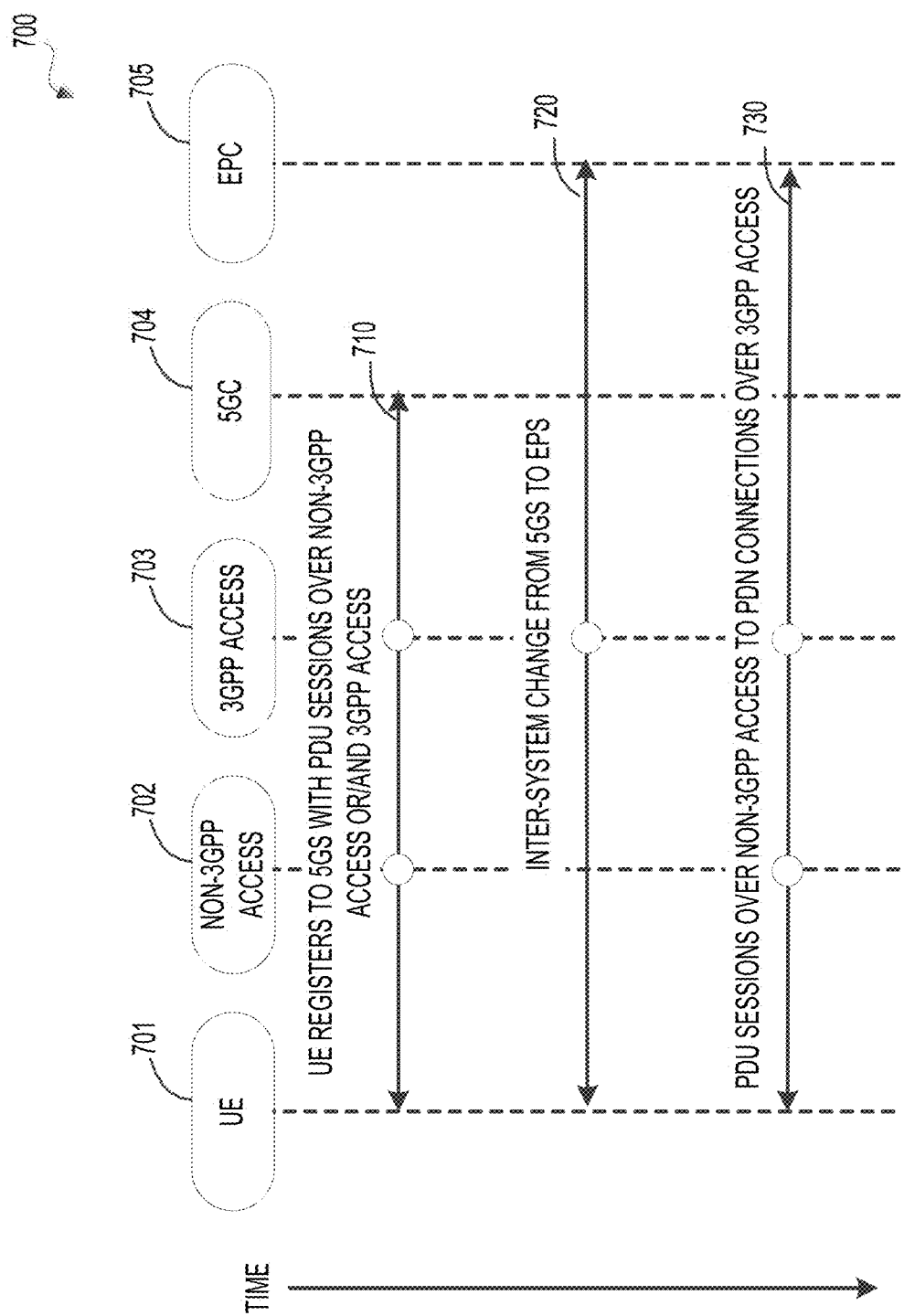
FIG. 7 shows another exemplary PDU session transfer procedure according to an embodiment of the disclosure.

FIG. 7 illustrates an exemplary PDU session transfer procedure 700 according to an embodiment of the disclosure. In the FIG. 7 example, the UE 701 is in the transfer mode and the procedure 700 can include three stages 710, 720, and 730.

At stage 710, the UE 701 in a 5GS can connect to a 5GC 704 over a non-3GPP access 702 and a 3GPP access 703. In some examples, the UE 701 can concurrently have at least one PDU session over the non-3GPP 702 and one PDU session over the 3GPP access 703. In some other examples, the UE 701 can register to the 5GS over the 3GPP access 703 but have no PDU session over the 3GPP access 703. Instead, the UE 701 can have at least one PDU session over the non-3GPP access 702.

At stage 720, the UE 701 is to perform an inter-system change from the 5GS to an EPS by switching the connection from the 5GC 704 to an EPC 705 over the 3GPP access 703.

At stage 730, the UE 701 can transfer the PDU session over the non-3GPP access 702 directly to a PDN connection over the 3GPP access 703. For example, as shown in the FIG. 1, the PDU operation module 115 and the PDN operation module 116 can work cooperatively and execute the program instructions stored in the program memory 119 to initiate a PDN connectivity procedure over a 3GPP access 123 and transfer the PDU session 150 over the non-3GPP access 121 directly to the PDN connection 170 over the 3GPP access 123.

Figure 8:
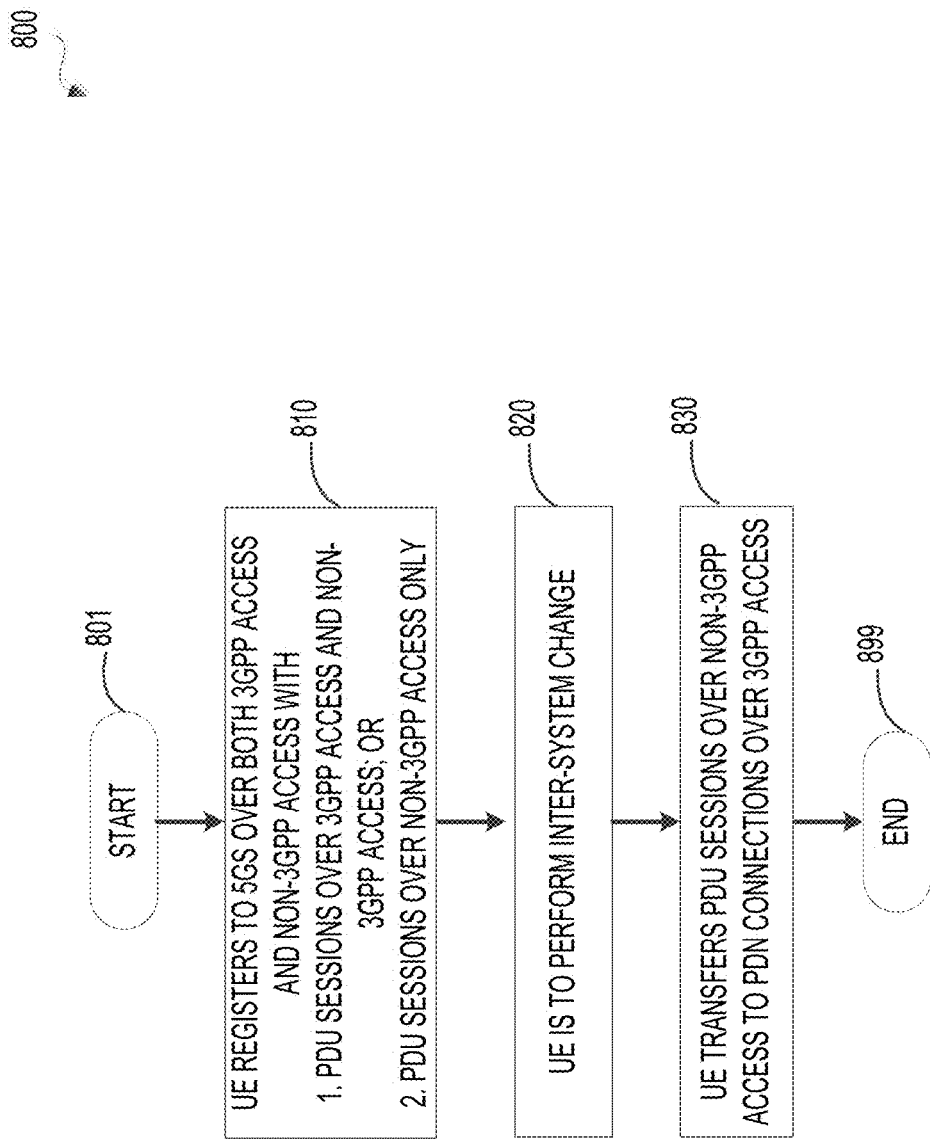
FIG. 8 is a flowchart showing another exemplary process wherein a UE transfers a PDU session over a non-3GPP access directly to a PDN connection over a 3GPP access according to an embodiment of the disclosure.

FIG. 8 shows a flowchart outlining an exemplary process 800 wherein the UE 110 transfers the PDU session 150 over the non-3GPP access 121 directly to the PDN connection 170 over the 3GPP access 123 according to an embodiment of the disclosure. The process 800 can be performed at the UE 110 which is connected to a first communication system and is to perform an inter-system change 100 from the first communication system to a second communication system. In the FIG. 8 example, the first communication system can be a 5GS and the second communication system can be an EPS. The process 800 can start from 801 and proceed to 810.

At 810, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 820.

At 820, the UE 110 can perform an inter-system change 100 from the 5GS to the EPS by switching the connection from the 5GC 131 to the EPC 132 over a 3GPP access 123. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 830.

At 830, upon the inter-system change 100 from the 5GS to the, the UE 110 can transfer the PDU session 150 over the non-3GPP access 121 directly to a PDU connection 170 over a 3GPP access 123. For example, as shown in the FIG. 1, the PDU operation module 115 and the PDN operation module 116 can work cooperatively and execute the program instructions stored in the program memory 119 to initiate a PDN connectivity procedure over a 3GPP access 123 and transfer the PDU session 150 over the non-3GPP access 121 directly to the PDN connection 170 over the 3GPP access 123. The process can then proceed to 899 and terminate.

Figure 9:
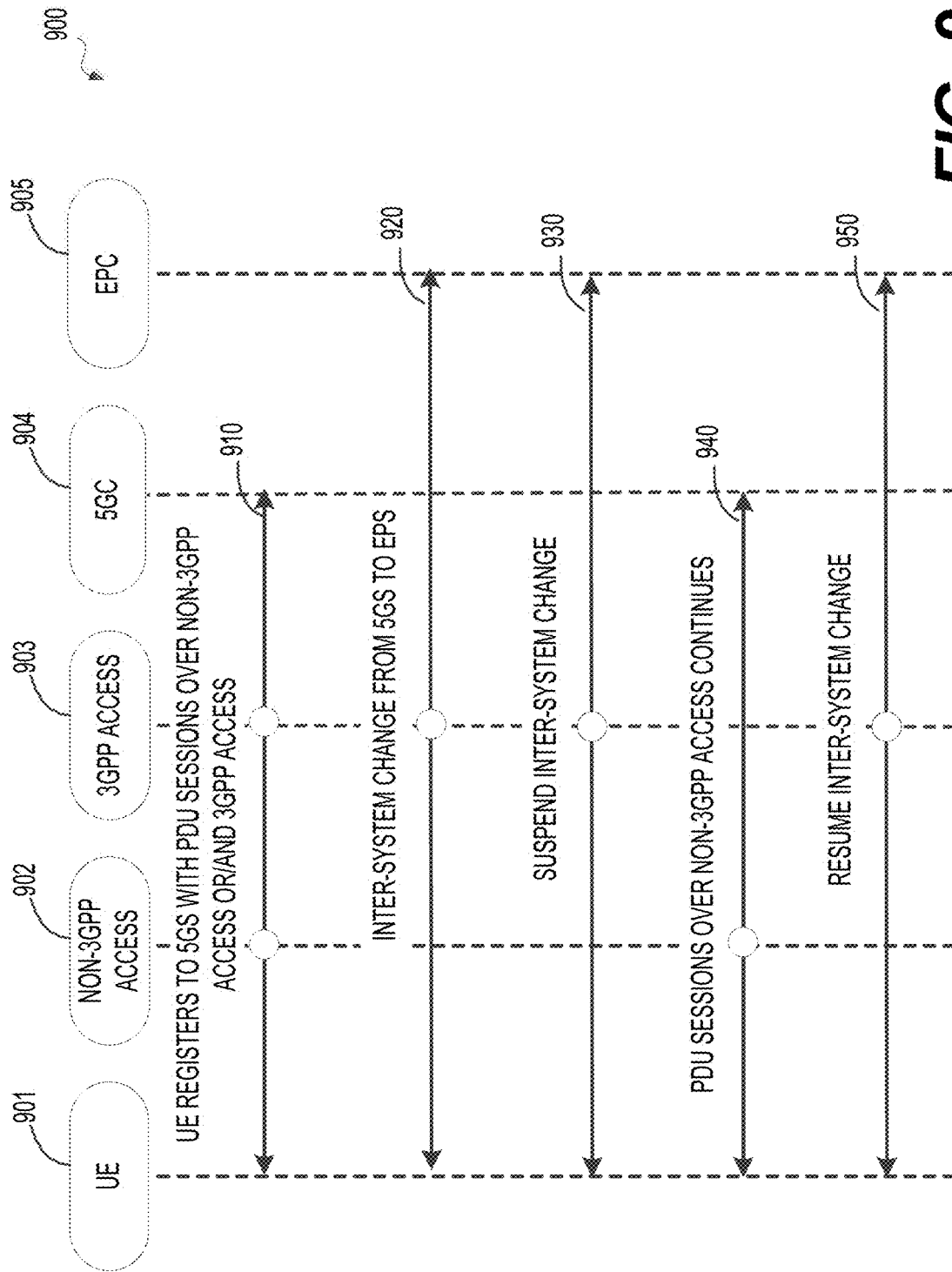
FIG. 9 shows an exemplary PDU session operation procedure according to an embodiment of the disclosure.

FIG. 9 illustrates an exemplary PDU session operation procedure 900 according to an embodiment of the disclosure. In the FIG. 9 example, the UE 901 is in the execution mode and the procedure 900 can include five stages 910, 920, 930, 940, and 950.

At stage 910, the UE 901 in a 5GS can connect to a 5GC 904 over a non-3GPP access 902 and a 3GPP access 903. In some examples, the UE 901 can concurrently have at least one PDU session over the non-3GPP 902 and one PDU session over the 3GPP access 903. In some other examples, the UE 901 can register to the 5GS over the 3GPP access 903 but have no PDU session over the 3GPP access 903. Instead, the UE 901 can have at least one PDU session over the non-3GPP access 902.

At stage 920, the UE 901 is to perform an inter-system change from the 5GS to an EPS by switching the connection from the 5GC 904 to an EPC 905 over the 3GPP access 903.

At stage 930, the UE 901 can suspend the inter-system change from the 5GS to the EPS over the 3GPP access 903. For example, as shown in the FIG. 1, the inter-system change module 114 can stop executing the program instructions stored in the inter-system change memory 118 so that the inter-system change from the 5GS to the EPS can be suspended.

At stage 940, the UE 901 can continue the PDU session over the non-3GPP access 902. For example, as shown in the FIG. 1, the PDU operation module 115 can execute the program instructions stored in the program memory 119 to maintain the PDU session 150 over the non-3GPP access 121 and keep it running.

At stage 950, the UE 901 can resume the inter-system change from the 5GS to the EPS when the PDU session over the non-3GPP access 902 is completed. For example, as shown in the FIG. 1, the inter-system change module 114 can execute the program instructions stored in the inter-system change memory 118 to resume the inter-system change from the 5GS to the EPS when the PDU operation module 115 completes the executions of the program instructions stored in the program memory 119 for the PDU session 150 over the non-3GPP access 121.

Figure 10:
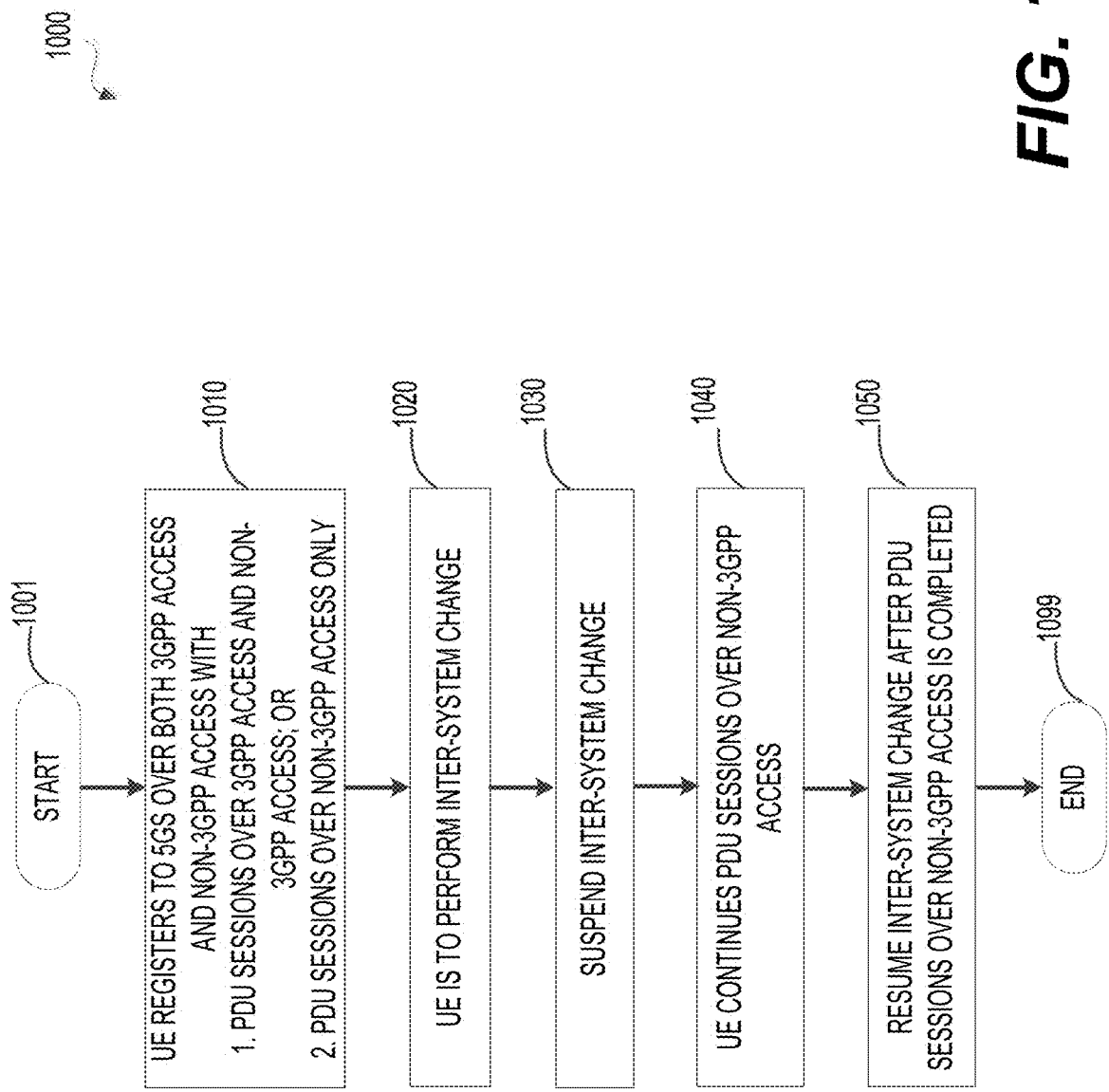
FIG. 10 is a flowchart showing an exemplary process wherein an inter-system change is suspended and a PDU session over a non-3GPP access is maintained according to an embodiment of the disclosure.

FIG. 10 shows a flowchart outlining an exemplary process 1000 wherein the UE 110 suspends an inter-system change 100 and maintains the PDU session 150 over the non-3GPP access 121 according to an embodiment of the disclosure. The process 1000 can be performed at the UE 110 which is connected to a first communication system and is to perform an inter-system change 100 from the first communication system to a second communication system. In the FIG. 10 example, the first communication system can be a 5GS and the second communication system can be an EPS. The process 1000 can start from 1001 and proceed to 1010.

At 1010, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 1020.

At 1020, the UE 110 can perform an inter-system change 100 from the 5GS to the EPS by switching the connection from the 5GC 131 to the EPC 132. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 1030.

At 1030, the UE 110 can suspend the inter-system change 100 from the 5GS to the EPS. For example, as shown in the FIG. 1, the inter-system change module 114 can stop executing the program instructions stored in the inter-system change memory 118 so that the inter-system change from the 5GS to the EPS can be suspended. The process can then proceed to 1040.

At 1040, the UE 110 can continue the PDU session 150 over the non-3GPP access 121. For example, as shown in the FIG. 1, the PDU operation module 115 can execute the program instructions stored in the program memory 119 to maintain the PDU session 150 over the non-3GPP access 121, so that the PDU session 150 over the non-3GPP access 121 can keep running and support the on-going Internet services and applications to the UE 110. The process can then proceed to 1050.

At 1050, the UE 110 can resume the inter-system change 100 from the 5GS to the EPS when the PDU session 150 over the non-3GPP access 121 is completed. For example, as shown in the FIG. 1, the inter-system change module 114 can execute the program instructions stored in the inter-system change memory 118 to resume the inter-system change from the 5GS to the EPS when the PDU operation module 115 completes the executions of the program instructions stored in the program memory 119 for the PDU session 150 over the non-3GPP access 121. The process can then proceed to 1099 and terminate.

Figure 11:
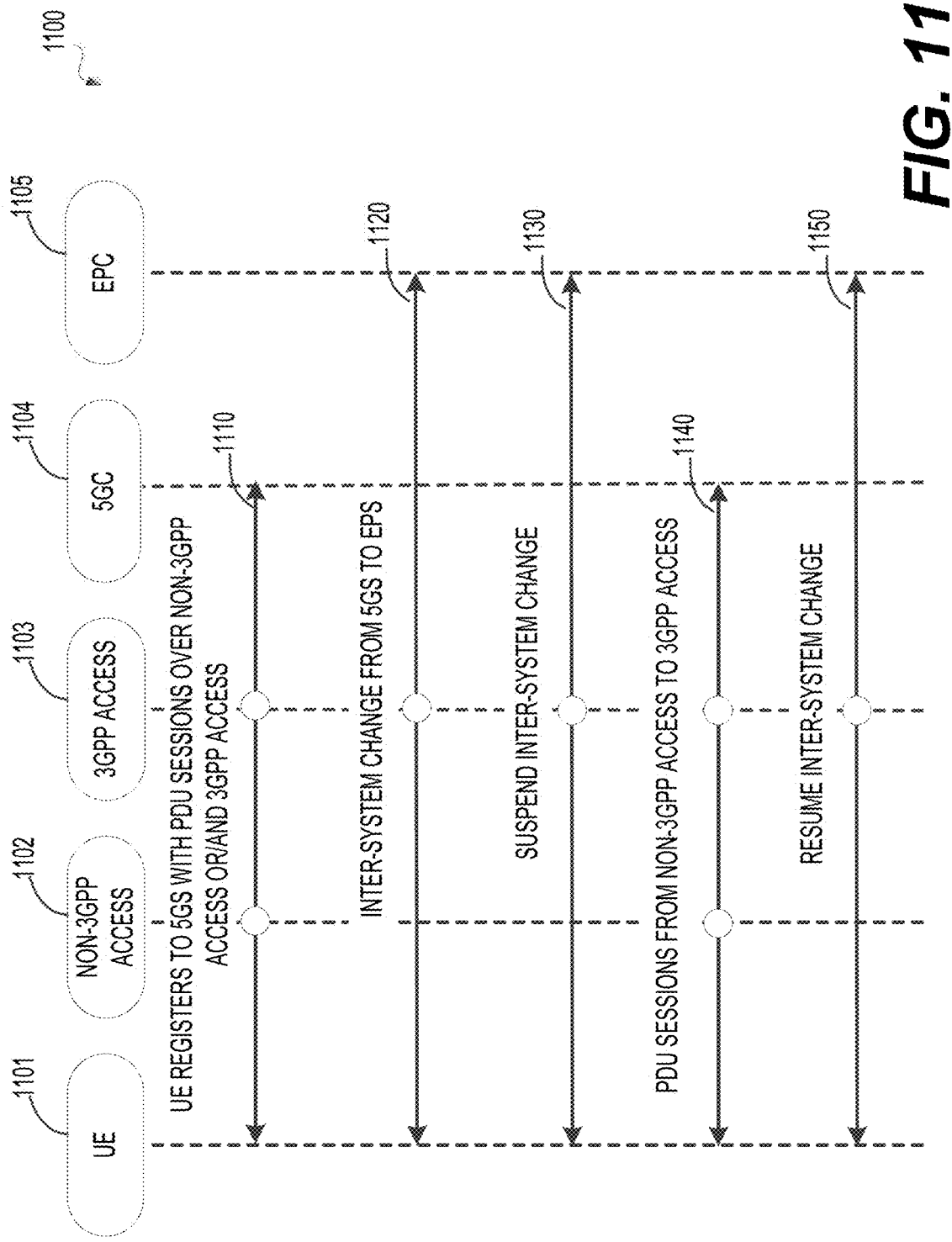
FIG. 11 shows another exemplary PDU session transfer procedure according to an embodiment of the disclosure.

FIG. 11 illustrates another exemplary PDU session operation procedure 1100 according to an embodiment of the disclosure. In the FIG. 11 example, the UE 1101 is in the execution mode and the procedure 1100 can include five stages 1110, 1120, 1130, 1140, and 1150.

At stage 1110, the UE 1101 in a 5GS can connect to a 5GC 1104 over a non-3GPP access 1102 and a 3GPP access 1103. In some examples, the UE 1101 can concurrently have at least one PDU session over the non-3GPP 1102 and one PDU session over the 3GPP access 1103. In some other examples, the UE 1101 can register to the 5GS over the 3GPP access 1103 but have no PDU session over the 3GPP access 1103. Instead, the UE 1101 can have at least one PDU session over the non-3GPP access 1102.

At stage 1120, the UE 1101 is to perform an inter-system change from the 5GS to an EPS by switching the connection from the 5GC 1104 to an EPC 1105 over the 3GPP access 1103.

At stage 1130, the UE 1101 can suspend the inter-system change from the 5GS to the EPS over the 3GPP access 1103. For example, as shown in the FIG. 1, the inter-system change module 114 can stop executing the program instructions stored in the inter-system change memory 118 so that the inter-system change from the 5GS to the EPS can be suspended.

At stage 1140, the UE 1101 can transfer the PDU session from the non-3GPP access 1102 to the 3GPP access 1103. For example, as shown in the FIG. 1, the processing circuitry 113 of the UE 110 can trigger the PDU operation module 115 to execute the program instructions stored in the program memory 119. The executed instructions can further initiate a 5GSM procedure or a 5GMM procedure to transfer the PDU session 150 from the non-3GPP access 121 to the 3GPP access 122.

At stage 1150, the UE 1101 can resume the inter-system change from the 5GS to the EPS after transferring the PDU session from the non-3GPP access 1102 to the 3GPP access 1103. For example, as shown in the FIG. 1, the inter-system change module 114 can execute the program instructions stored in the inter-system change memory 118 to resume the inter-system change from the 5GS to the EPS when the PDU operation module 115 completes the executions of the program instructions stored in the program memory 119 for transferring the PDU session 150 from the non-3GPP access 121 to the 3GPP access 122.

Figure 12:
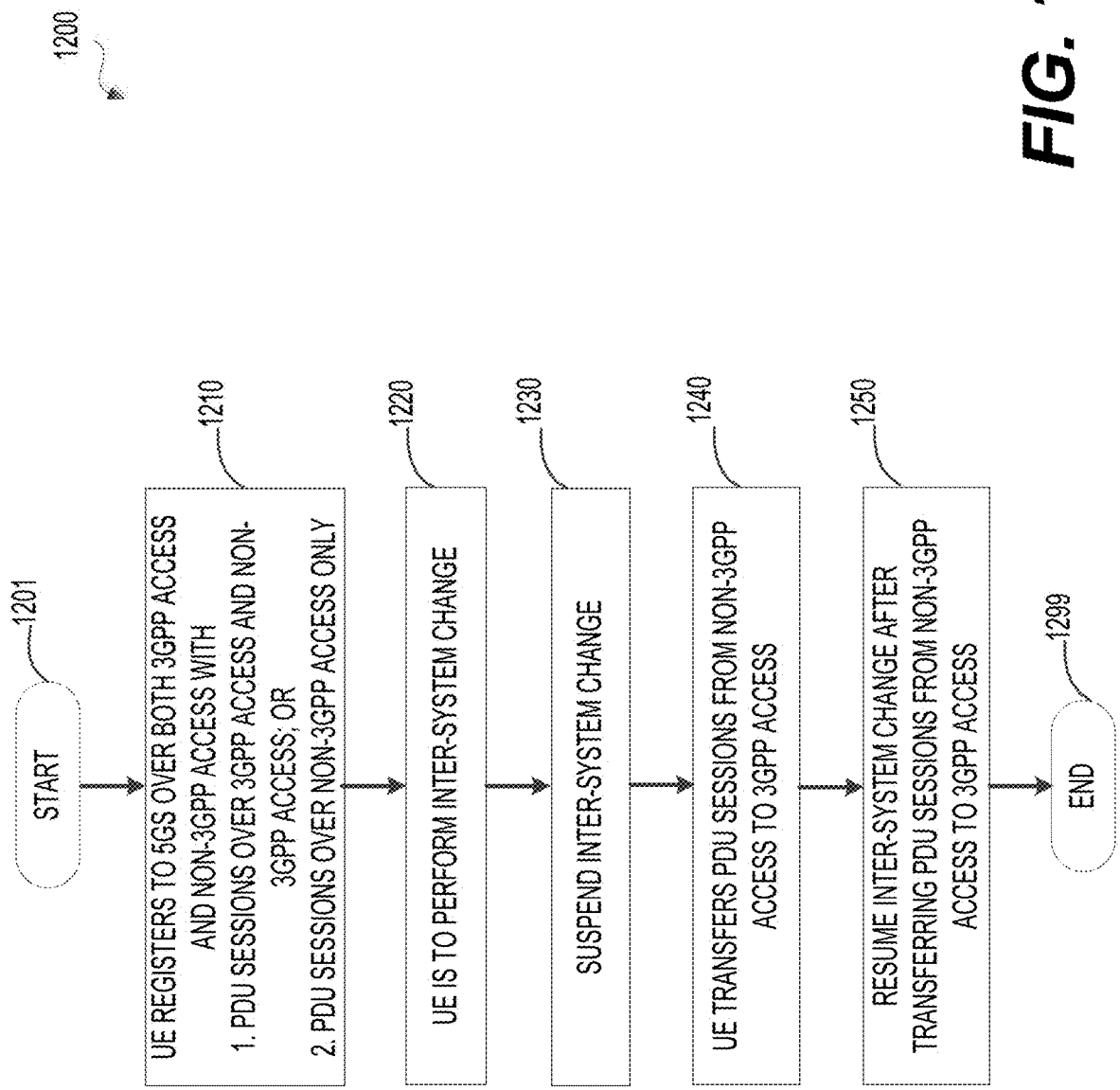
FIG. 12 is a flowchart showing an exemplary process wherein an inter-system change is suspended and a PDU session is transferred from a non-3GPP access to a 3GPP access according to an embodiment of the disclosure.

FIG. 12 shows a flowchart outlining an exemplary process 1200 wherein the UE 110 suspends an inter-system change 100 and transfers a PDU session over the non-3GPP access according to an embodiment of the disclosure. The process 1200 can be performed at the UE 110 which is connected to a first communication system and is to perform an inter-system change 100 from the first communication system to a second communication system. In the FIG. 12 example, the first communication system can be a 5GS and the second communication system can be an EPS. The process 1200 can start from 1201 and proceed to 1210.

At 1210, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 1220.

At 1220, the UE 110 can perform an inter-system change 100 from the 5GS to the EPS by switching the connection from the 5GC 131 to the EPC 132. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 1230.

At 1230, the UE 110 can suspend the inter-system change from the 5GS to the EPS. For example, as shown in the FIG. 1, the inter-system change module 114 can stop executing the program instructions stored in the inter-system change memory 118 so that the inter-system change from the 5GS to the EPS can be suspended. The process can then proceed to 1240.

At 1240, the UE 110 can transfer the PDU session 150 over the non-3GPP access 121 to the PDU session 160 over the 3GPP access 122. For example, as shown in the FIG. 1, the processing circuitry 113 of the UE 110 can trigger the PDU operation module 115 to execute the program instructions stored in the program memory 119. The executed instructions can further initiate a 5GSM procedure or a 5GMM procedure to transfer the PDU session 150 from the non-3GPP access 121 to the 3GPP access 122. The process can then proceed to 1250.

At 1250, the UE 110 can resume the inter-system change 100 from the 5GS to the EPS after transferring the PDU session 150 from the non-3GPP access 121 to the 3GPP access 122. For example, as shown in the FIG. 1, the inter-system change module 114 can execute the program instructions stored in the inter-system change memory 118 to resume the inter-system change 100 from the 5GS to the EPS when the PDU operation module 115 completes the executions of the program instructions stored in the program memory 119 for transferring the PDU session 150 from the non-3GPP access 121 to the 3GPP access 122. The process can then proceed to 1299 and terminate.

Figure 13:
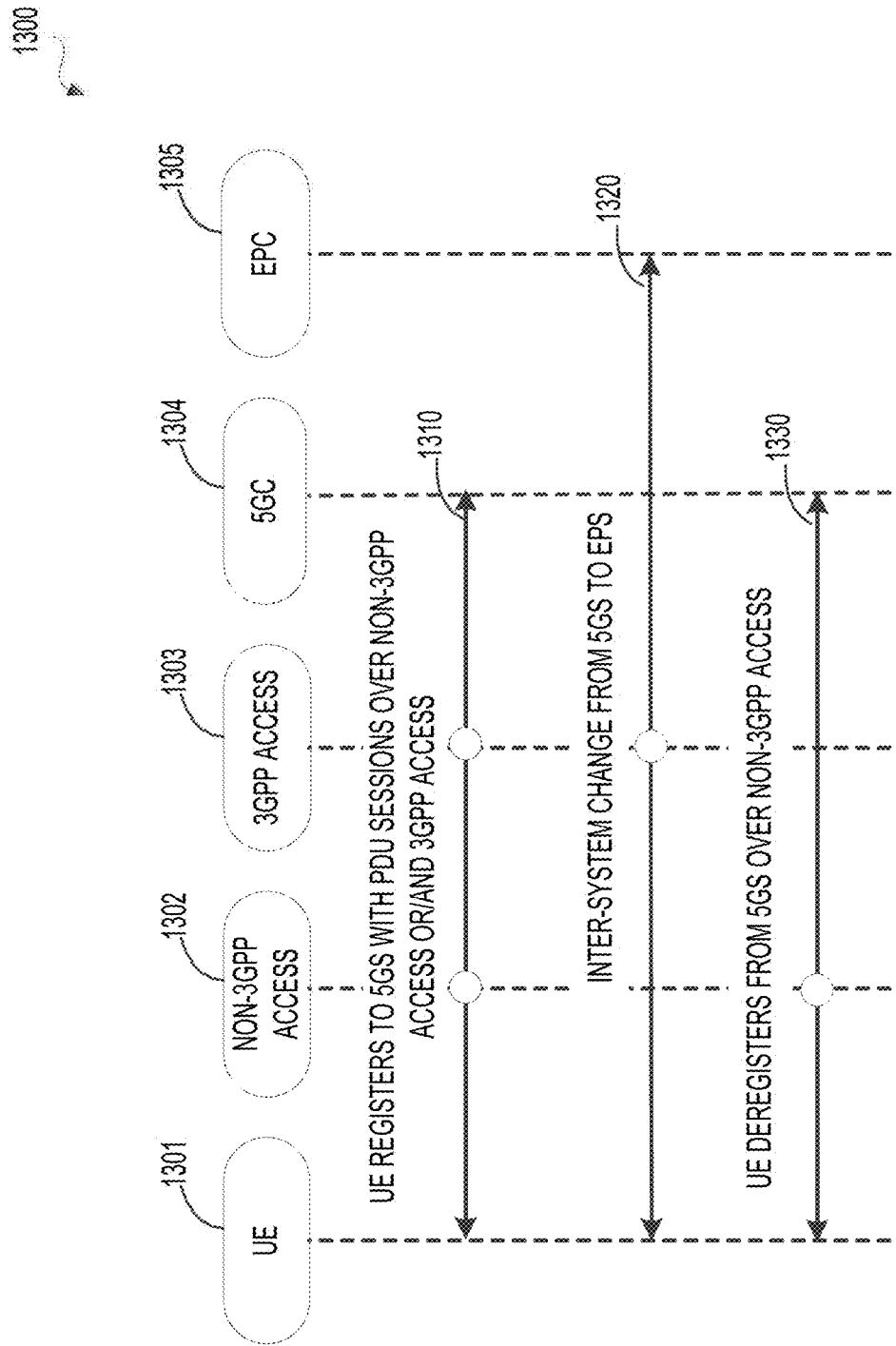
FIG. 13 shows an exemplary UE deregistration procedure according to an embodiment of the disclosure.

FIG. 13 illustrates an exemplary UE deregistration procedure 1300 according to an embodiment of the disclosure. In the FIG. 11 example, the UE 1101 is in the deregistration mode and the procedure 1300 can include five stages 1310, 1320, and 1330.

At stage 1310, the UE 1301 in a 5GS can connect to a 5GC 1304 over a non-3GPP access 1302 and a 3GPP access 1303. In some examples, the UE 1301 can concurrently have at least one PDU session over the non-3GPP 1302 and one PDU session over the 3GPP access 1303. In some other examples, the UE 1301 can register to the 5GS over the 3GPP access 1303 but have no PDU session over the 3GPP access 1303. Instead, the UE 1301 can have at least one PDU session over the non-3GPP access 1302.

At stage 1320, the UE 1301 is to perform an inter-system change from the 5GS to an EPS by switching the connection from the 5GC 1304 to an EPC 1305 over the 3GPP access 1303.

At stage 1330, the UE 1301 can deregister from the 5GS over the non-3GPP access 1302 when the UE 1301 cannot support concurrent registrations to the 5GS over the non-3GPP access 1302 and the EPS over the 3GPP access 1303. For example, as shown in the FIG. 1, when the processing circuitry 113 cannot support concurrent registrations to the 5GS over the non-3GPP access 121 and the EPS over the 3GPP access 123, the processing circuitry 113 can execute the program instructions stored in the memory 117 to deregister from the 5GS over the non-3GPP access 121.

Figure 14:
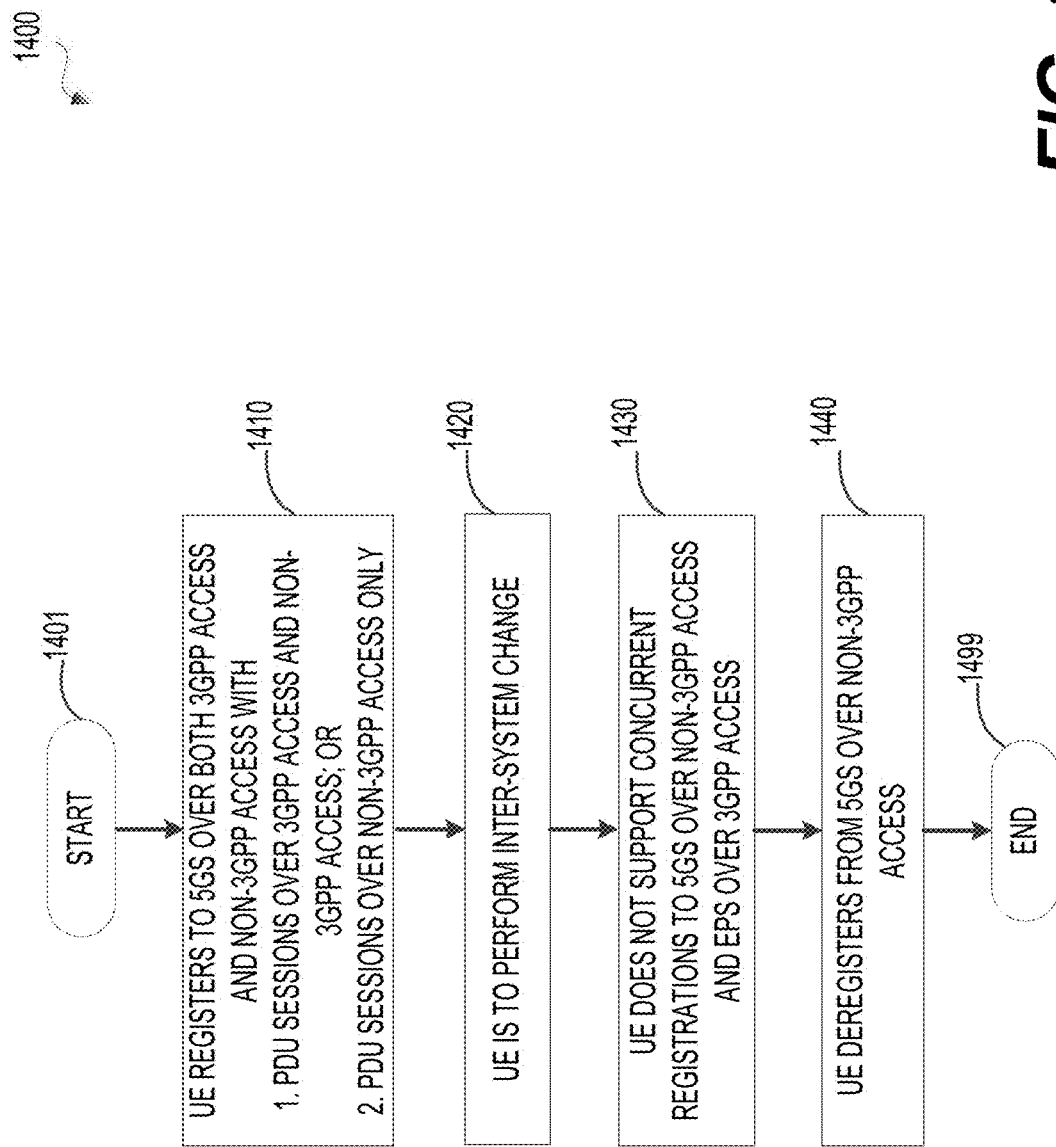
FIG. 14 is a flowchart showing an exemplary process wherein a UE deregisters from 5GS over a non-3GPP access according to an embodiment of the disclosure.

FIG. 14 shows a flowchart outlining an exemplary process 1400 wherein the UE 110 deregisters from the 5GS over the non-3GPP access 121 according to an embodiment of the disclosure. The process 1400 can be performed at the UE 110 which is connected to a first communication system and is to perform an inter-system change 100 from the first communication system to a second communication system. In the FIG. 14 example, the first communication system can be a 5GS and the second communication system can be an EPS. The process 1400 can start from 1401 and proceed to 1410.

At 1410, the UE 110 can register to the 5GS by connecting to the 5GC 131 over the non-3GPP access 121 and the 3GPP access 122. In some examples, the UE 110 can have one or more PDU session(s) 150 over the non-3GPP access 121 and one or more PDU session(s) 160 over the 3GPP access 122, respectively. In some other examples, the UE 110 can only register to the 5GS but have no PDU session 160 over the 3GPP access 122. Instead, the UE 110 can have one or more PDU session(s) 150 over the non-3GPP access 121. The process can then proceed to 1420.

At 1420, the UE 110 can perform an inter-system change 100 from the 5GS to the EPS by switching the connection from the 5GC 131 to the EPC 132 over a 3GPP access 123. For example, as shown in the FIG. 1, the processing circuitry 113 of the UE 110 can trigger the inter-system change module 114 to execute the program instructions stored in the inter-system change memory 118. The executed instructions can further generate wireless signals through the RF module 112 and transmit via the antenna 111. The wireless signals can include UE 110 information, release request for the 5GS, and registration request for the EPS. The process can then proceed to 1430.

At 1430, the UE 110 can deregister from the 5GS over the non-3GPP access 121 when the UE 110 cannot support concurrent registrations to the 5GS over the non-3GPP access 121 and the EPS over the 3GPP access 123. For example, as shown in the FIG. 1, when the processing circuitry 113 cannot support concurrent registrations to the 5GS over the non-3GPP access 121 and the EPS over the 3GPP access 123, the processing circuitry 113 can execute the program instructions stored in the memory 117 to deregister from the 5GS over the non-3GPP access 121. The process can then proceed to 1499 and terminate.

Figure 15:
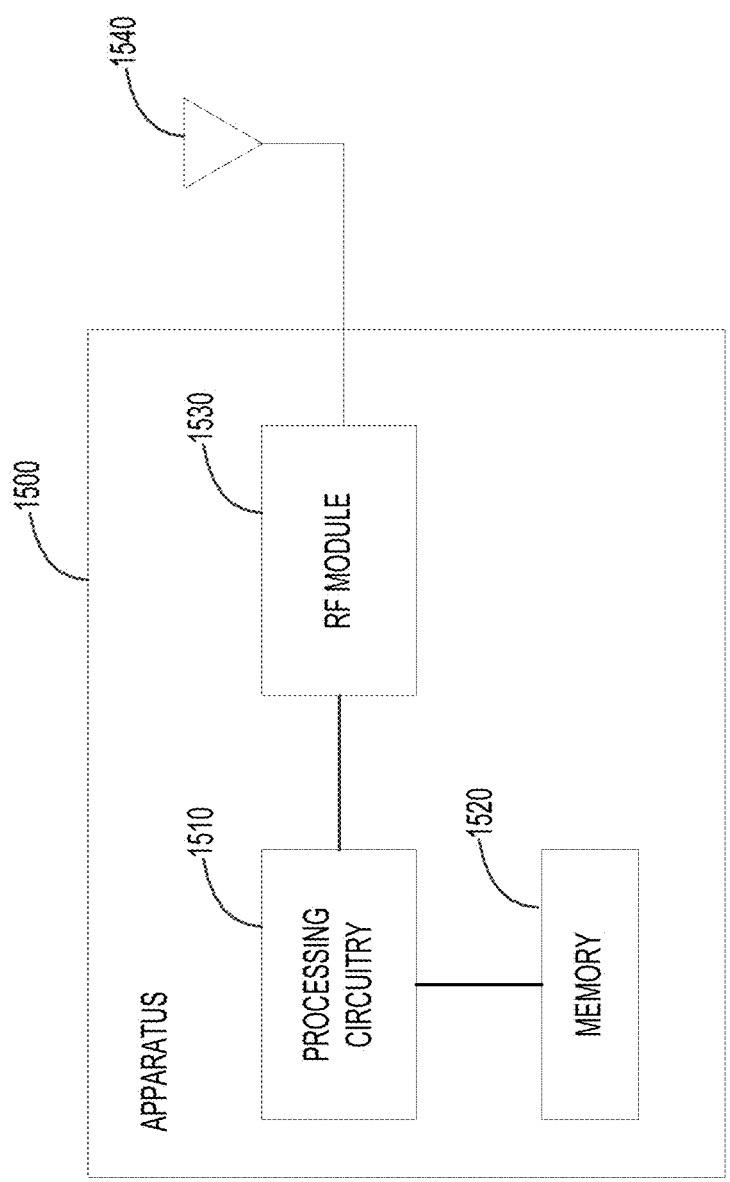
FIG. 15 shows an exemplary block diagram of a UE according to an embodiment of the disclosure.

FIG. 15 shows an exemplary apparatus 1500 according to embodiments of the disclosure. The apparatus 1500 can be configured to perform various functions in accordance with one or more embodiments or examples described herein. Thus, the apparatus 1500 can provide means for implementation of techniques, processes, functions, components, systems described herein. For example, the apparatus 1500 can be used to implement functions of the UE 110 in various embodiments and examples described herein. The apparatus 1500 can be a general purpose computer in some embodiments, and can be a device including specially designed circuits to implement various functions, components, or processes described herein in other embodiments. The apparatus 1500 can include processing circuitry 1510, a memory 1520, a radio frequency (RF) module 1530, and an antenna 1540.

In various examples, the processing circuitry 1510 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1510 can be a central processing unit (CPU) configured to execute program instructions to perform various functions and processes described herein. Accordingly, the memory 1520 can be configured to store program instructions. The processing circuitry 1510, when executing the program instructions, can perform the functions and processes. The memory 1520 can further store other programs or data, such as operating systems, application programs, and the like. The memory can include transitory or non-transitory storage medium. The memory 1520 can include a read only memory (ROM), a random access memory (RAM), a flash memory, a solid state memory, a hard disk drive, an optical disk drive, and the like.

The RF module 1530 receives processed data signal from the processing circuitry 1510 and transmits the signal in a beam-formed wireless communication network via an antenna 1540, or vice versa. The RF module 1530 can include a digital to analog convertor (DAC), an analog to digital converter (ADC), a frequency up convertor, a frequency down converter, filters, and amplifiers for reception and transmission operations. The RF module 1530 can include multi-antenna circuitry (e.g., analog signal phase/amplitude control units) for beamforming operations. The antenna 1540 can include one or more antenna arrays.

The apparatus 1500 can optionally include other components, such as input and output devices, additional or signal processing circuitry, and the like. Accordingly, the apparatus 1500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising processing circuitry that is configured to:
   connect to a first communication system over a 3GPP access and a non-3GPP access;
   switch the connection from the first communication system to a second communication system;
   wherein, in a release mode the processing circuitry releases a Protocol Data Unit (PDU) session that is in the first communication system over the non-3GPP access, and in a transfer mode the processing circuitry transfers the PDU session that is in the first communication system over the non-3GPP access to a Packet Data Network (PDN) connection that is in the second communication system over a 3GPP access by:
      transferring the PDU session that is in the first communication system over the non-3GPP access to the PDU session that is in the first communication system over the 3GPP access, and then transferring the PDU session that is in the first communication system over the 3GPP access to the PDN connection that is in the second communication system over the 3GPP access; or
      transferring the PDU session that is in the first communication system over the non-3GPP access directly to the PDN connection that is in the second communication system over the 3GPP access.

2. The apparatus of claim 1, wherein the processing circuitry releases the PDU session that is in the first communication system over the non-3GPP access, further includes one of:
   releasing locally at the apparatus; or
   releasing using a Non-Access Stratum (NAS) procedure.

3. The apparatus of claim 1, wherein transferring the PDU session that is in the first communication system over the non-3GPP access directly to the PDN connection that is in the second communication system over the 3GPP access, further includes initiating a PDN connectivity procedure in the second communication system.

4. The apparatus of claim 1, wherein the processing circuitry is further configured to:
   suspend an inter-system change between the first communication system and the second communication system;
   transfer the PDU session that is in the first communication system from the non-3GPP access to the 3GPP access; and
   resume the inter-system change after transferring the PDU session from the non-3GPP access to the 3GPP access.

5. The apparatus of claim 1, wherein the processing circuitry is further configured to:
   suspend an inter-system change between the first communication system and the second communication system;
   maintain the PDU session that is in the first communication system over the non-3GPP access; and
   resume the inter-system change after the PDU session is completed.

6. The apparatus of claim 1, wherein the processing circuitry is further configured to deregister from the first communication system over the non-3GPP access before the PDU session in the first communication system is transferred from the non-3GPP access to the 3GPP access.

7. A method, comprising:
connecting, by a processing circuitry of a user equipment (UE), to a first communication system over a 3GPP access and a non-3GPP access;
switching the connection from the first communication system to a second communication system;
wherein, in a release mode the processing circuitry releases a Protocol Data Unit (PDU) session that is in the first communication system over the non-3GPP access, and in a transfer mode the processing circuitry transfers the PDU session that is in the first communication system over the non-3GPP access to a Packet Data Network (PDN) connection that is in the second communication system over a 3GPP access by:
transferring the PDU session that is in the first communication system over the non-3GPP access to the PDU session that is in the first communication system over the 3GPP access, and then transferring the PDU session that is in the first communication system over the 3GPP access to the PDN connection that is in the second communication system over the 3GPP access; or
transferring the PDU session that is in the first communication system over the non-3GPP access directly to the PDN connection that is in the second communication system over the 3GPP access.

8. The method of claim 7, wherein releasing the PDU session that is connected to the first communication system over the non-3GPP access further includes one of:
releasing locally at the apparatus; or
releasing using a Non-Access Stratum (NAS) procedure.

9. The method of claim 7, wherein transferring the PDU session that is in the first communication system over the non-3GPP access directly to the PDN connection that is in the second communication system over the 3GPP access, further includes initiating a PDN connectivity procedure in the second communication system.

10. The method of claim 7, further including:
suspending an inter-system change between the first communication system and the second communication system;
transferring the PDU session that is in the first communication system from the non-3GPP access to the 3GPP access; and
resuming the inter-system change after transferring the PDU session from the non-3GPP access to the 3GPP access.

11. The method of claim 7, further including:
suspending an inter-system change between the first communication system and the second communication system;
maintaining the PDU session that is in the first communication system over the non-3GPP access; and
resuming the inter-system change after the PDU session is completed.

12. The method of claim 7, further including deregistering from the first communication system over the non-3GPP access before the PDU session in the first communication system is transferred from the non-3GPP access to the 3GPP access.

13. A non-transitory computer readable medium storing instructions which, when executed by a processor, cause the processor to perform the steps of:
connecting to a first communication system over a 3GPP access and a non-3GPP access;
switching the connection from the first communication system to a second communication system; and
in a release mode, releasing a Protocol Data Unit (PDU) session that is in the first communication system over the non-3GPP access, and in a transfer mode, transferring the PDU session that is in the first communication system over the non-3GPP access to a Packet Data Network (PDN) connection that is in the second communication system over a 3GPP access by:
transferring the PDU session that is in the first communication system over the non-3GPP access to the PDU session that is in the first communication system over the 3GPP access, and then transferring the PDU session that is in the first communication system over the 3GPP access to the PDN connection that is in the second communication system over the 3GPP access; or
transferring the PDU session that is in the first communication system over the non-3GPP access directly to the PDN connection that is in the second communication system over the 3GPP access.

14. The non-transitory computer readable medium of claim 13, wherein the instructions being executed by the processor to release the PDU session that is in the first communication system over the non-3GPP access further causes the processor to perform the steps of:
releasing locally at the apparatus; or
releasing using a Non-Access Stratum (NAS) procedure.

15. The non-transitory computer readable medium of claim 13, wherein the instructions being executed by the processor to transfer the PDU session that is in the first communication system over the non-3GPP access directly to the PDN connection that is in the second communication system over the 3GPP access, further causes the processor to perform the step of initiating a PDN connectivity procedure in the second communication system.

16. The non-transitory computer readable medium of claim 13, wherein the instructions being executed by the processor, further cause the processor to perform the steps of:
suspending an inter-system change between the first communication system and the second communication system;
transferring the PDU session that is in the first communication system from the non-3GPP access to the 3GPP access; and
resuming the inter-system change after transferring the PDU session from the non-3GPP access to the 3GPP access.

17. The non-transitory computer readable medium of claim 13, wherein the instructions being executed by the processor, further cause the processor to perform the steps of:
suspending an inter-system change between the first communication system and the second communication system;
maintaining the PDU session that is in the first communication system over the non-3GPP access; and
resuming the inter-system change after the PDU session is completed.

* * * * *